US010651724B2

(12) United States Patent
Jones et al.

(10) Patent No.: US 10,651,724 B2
(45) Date of Patent: *May 12, 2020

(54) SYSTEMS AND METHODS FOR INCREASING OUTPUT CURRENT QUALITY, OUTPUT POWER, AND RELIABILITY OF GRID-INTERACTIVE INVERTERS

(71) Applicant: Chilicon Power, LLC, Pacific Palisades, CA (US)

(72) Inventors: Christopher Richard Jones, Pacific Palisades, CA (US); Alexandre Rudolph Kral, Laguna Niguel, CA (US)

(73) Assignee: Chilicon Power, LLC, Pacific Palisades, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/172,523

(22) Filed: Oct. 26, 2018

(65) Prior Publication Data

US 2019/0207506 A1 Jul. 4, 2019

Related U.S. Application Data

(63) Continuation of application No. 15/614,352, filed on Jun. 5, 2017, now abandoned, which is a continuation
(Continued)

(51) Int. Cl.
*H02M 1/12* (2006.01)
*H02J 3/38* (2006.01)
(Continued)

(52) U.S. Cl.
CPC .............. *H02M 1/12* (2013.01); *H02J 3/383* (2013.01); *H02M 1/44* (2013.01); *H02M 7/537* (2013.01); *Y02E 10/563* (2013.01)

(58) Field of Classification Search
CPC .......... H02M 1/12; H02M 1/44; H02M 7/537; H02J 3/383; Y02E 10/563
See application file for complete search history.

(56) References Cited

U.S. PATENT DOCUMENTS

| 6,590,793 B1 * | 7/2003 | Nagao ...................... H02J 7/35 |
| | | 323/222 |
| 6,914,418 B2 | 7/2005 | Sung |
| (Continued) | | |

OTHER PUBLICATIONS

"AN3095 Application Note, STEVAL-ISV002V1, STEVAL-ISV002V2 3 kW grid-connected PV system, based on the STM32x", STMicroelectronics, Doc 16555, Rev. 2, Jun. 2011, 55 pgs.
(Continued)

*Primary Examiner* — Emily P Pham
(74) *Attorney, Agent, or Firm* — KPPB LLP

(57) ABSTRACT

Various enhancements to grid-interactive inverters in accordance with embodiments of the invention are disclosed. One embodiment includes input terminals configured to receive a direct current, output terminals configured to provide an alternating output current to the utility grid, a controller, an output current sensor, and a DC-AC inverter stage comprising a plurality of switches controlled by control signals generated by the controller. In addition, the controller is configured to: generate control signals that cause the switches in the DC-AC inverter stage to switch a direct current in a bidirectional manner; measure the alternating output current; perform frequency decomposition of the output current; and generate control signals that cause the switches in the DC-AC inverter stage to switch current in a way that the magnitude of a plurality of unwanted current components is subtracted from the resulting output current.

21 Claims, 15 Drawing Sheets

Related U.S. Application Data of application No. 15/043,240, filed on Feb. 12, 2016, now Pat. No. 9,698,668, which is a continuation of application No. 14/329,775, filed on Jul. 11, 2014, now Pat. No. 9,263,936, which is a continuation of application No. 13/546,993, filed on Jul. 11, 2012, now Pat. No. 8,780,592.

(60) Provisional application No. 61/506,343, filed on Jul. 11, 2011.

(51) Int. Cl.
 *H02M 1/44* (2007.01)
 *H02M 7/537* (2006.01)

(56) References Cited

U.S. PATENT DOCUMENTS

| | | | | |
|---|---|---|---|---|
| 7,733,670 | B2* | 6/2010 | Feng | H02J 7/35 |
| | | | | 363/17 |
| 7,855,906 | B2* | 12/2010 | Klodowski | H02M 7/48 |
| | | | | 363/97 |
| 8,228,699 | B2 | 7/2012 | Iwata et al. | |
| 8,233,295 | B2 | 7/2012 | Ransom et al. | |
| 8,410,635 | B2* | 4/2013 | Ransom | B60L 3/00 |
| | | | | 307/82 |
| 8,503,200 | B2* | 8/2013 | Chapman | H02J 3/383 |
| | | | | 363/131 |
| 8,587,962 | B2* | 11/2013 | Perisic | H02M 3/33507 |
| | | | | 363/127 |
| 8,670,249 | B2* | 3/2014 | Khajehoddin | G05F 1/67 |
| | | | | 323/906 |
| 8,710,699 | B2* | 4/2014 | Binder | H02J 3/383 |
| | | | | 307/64 |
| 8,780,592 | B1 | 7/2014 | Jones et al. | |
| 9,263,936 | B2 | 2/2016 | Jones et al. | |
| 9,698,668 | B2* | 7/2017 | Jones | H02J 3/383 |
| 2009/0103340 | A1* | 4/2009 | Bremicker | H02M 1/15 |
| | | | | 363/123 |
| 2011/0012429 | A1 | 1/2011 | Fornage | |
| 2011/0249475 | A1* | 10/2011 | Fujii | H02H 7/122 |
| | | | | 363/50 |
| 2011/0298305 | A1* | 12/2011 | Chisenga | H02M 3/156 |
| | | | | 307/151 |
| 2012/0008349 | A1 | 1/2012 | Scharf | |
| 2012/0212065 | A1 | 8/2012 | Cheng et al. | |
| 2012/0257429 | A1* | 10/2012 | Dong | H02M 3/1582 |
| | | | | 363/127 |
| 2012/0290145 | A1* | 11/2012 | Joshi | H02J 3/385 |
| | | | | 700/298 |
| 2012/0306515 | A1 | 12/2012 | Barnes et al. | |
| 2013/0002031 | A1 | 1/2013 | Mulkey et al. | |
| 2013/0099581 | A1 | 4/2013 | Zhou et al. | |
| 2014/0204633 | A1* | 7/2014 | Khajehoddin | H02J 3/383 |
| | | | | 363/40 |
| 2014/0321173 | A1 | 10/2014 | Jones et al. | |
| 2016/0204688 | A1 | 7/2016 | Jones et al. | |
| 2017/0271973 | A1 | 9/2017 | Jones et al. | |

OTHER PUBLICATIONS

Chen et al., "Digital Control for Improved Efficiency and Reduced Harmonic Distortion Over Wide Load Range in Boost PFC Rectifiers", IEEE Trans. on Power Electronics, Oct. 2010, vol. 25, No. 10, pp. 2683-2692, published May 4, 2010.

Costinett et al., "GaN-FET based dual active bridge DC-DC converter", IEEE Applied Power Electronics Conference and Exposition (APEC), 2011, pp. 1425-1432, Mar. 6-11, 2011.

Erickson et al., "Fundamentals of Power Electronics", Second Edition, Springer, 2001, 881 pgs (Presented in 5 parts).

Johns et al., "Grid-Connected Solar Electronics", Department of Electrical Engineering and Computer Sciences, University of California at Berkeley, EE-290N-3-Contemporary Energy Issues, 2009, 12 pgs.

Kang et al., "Efficiency characterization and optimization in flyback DC-DC converters", IEEE Energy Conversion Congress and Exposition (ECCE), Sep. 12-16, 2010, pp. 527-534.

Kang et al., "On-line efficiency optimization in flyback DC-DC converters over wide ranges of operating conditions", IEEE Applied Power Electronics Conference and Exposition (APEC), Mar. 6-11, 2011, pp. 1417-1424.

Linares et al., "Improved Energy Capture in Series String Photovoltaics via Smart Distributed Power Electronics", IEEE Applied Power Electronics Conference and Exposition, Feb. 15-19, 2009, pp. 904-910.

Perreault, "Power Electronic Notes", MIT, Spring 2007, 23 pgs.

Xiao et al., "Topology Study of Photovoltaic Interface for Maximum Power Point Tracking", IEEE Transactions on Industrial Electronics, vol. 54, No. 3, Jun. 2007, pp. 1696-1704.

Yousefzadeh et al., "Sensorless optimization of dead times in DC-DC converters with synchronous rectifiers", IEEE Trans. on Power Electronics, Jul. 2006, vol. 21, No. 4, pp. 994-1002.

Zhang et al., "Multimode Digital Controller for Synchronous Buck Converters Operating Over Wide Ranges of Input Voltages and Load Currents", IEEE Trans. on Power Electronics, Aug. 2010, vol. 25, No. 8, pp. 1958-1965.

\* cited by examiner

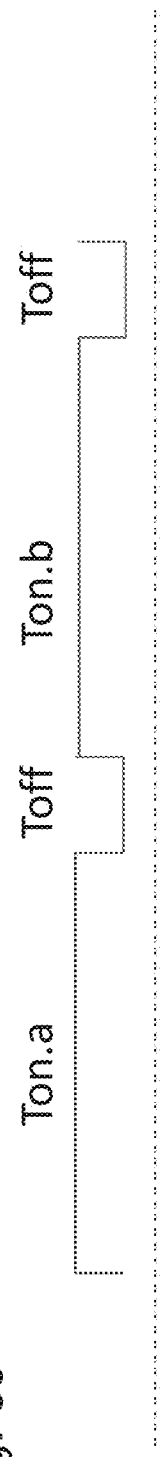
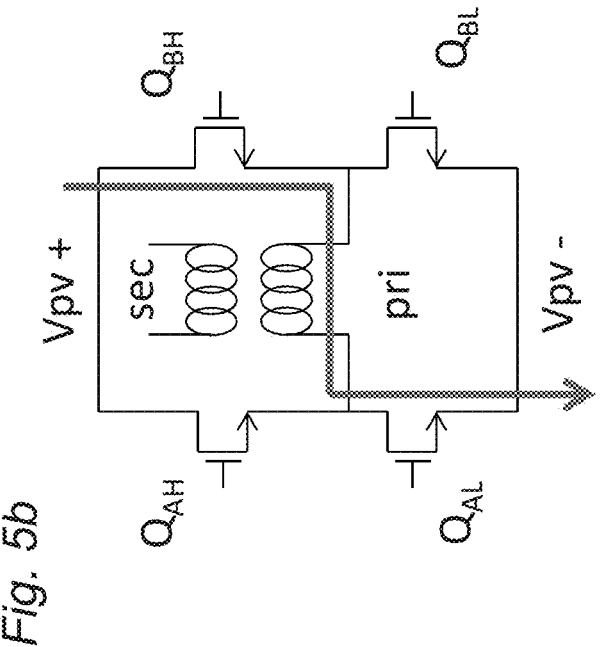
Fig. 5a
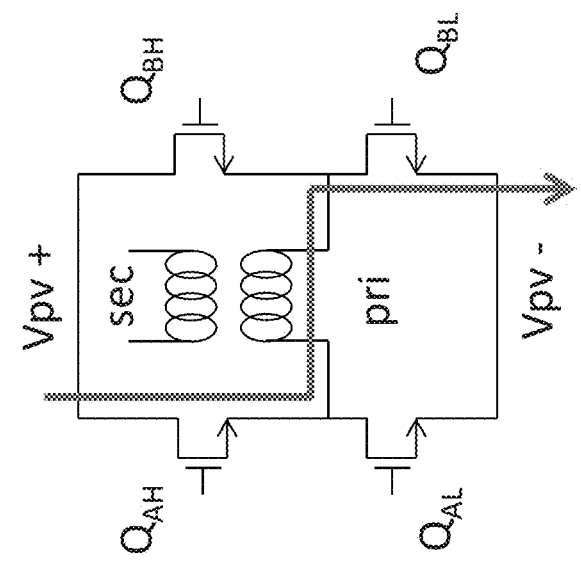
Fig. 5b
Fig. 5c

| Row Labels | 0.1 | 0.12 | 0.2 | 0.24 | 0.28 | 0.32 | 0.36 | 0.4 | Grand Total |
|---|---|---|---|---|---|---|---|---|---|
| 22 Ouput Watts | 90.63% | 90.65% | 90.82% | 90.99% | 91.07% | 91.11% | 91.31% | 91.23% | 91.31% |
| 6.8 | 90.29% | 90.35% | 90.61% | 90.62% | 90.87% | 90.85% | 90.76% | 90.97% | 90.97% |
| 7.25 | 90.35% | 90.40% | 90.68% | 90.85% | 90.86% | 90.80% | 90.99% | 91.03% | 91.03% |
| 7.75 | 90.37% | 90.41% | 90.65% | 90.72% | 90.83% | 91.00% | 90.97% | 91.08% | 91.08% |
| 8 | 90.45% | 90.48% | 90.59% | 90.80% | 90.87% | 91.00% | 91.02% | 91.23% | 91.23% |
| 8.25 | 90.55% | 90.65% | 90.80% | 90.86% | 90.86% | 91.11% | 91.12% | 91.07% | 91.12% |
| 8.5 | 90.53% | 90.53% | 90.78% | 90.82% | 90.94% | 91.08% | 90.94% | 91.19% | 91.19% |
| 8.75 | 90.49% | 90.50% | 90.58% | 90.78% | 90.99% | 91.07% | 91.31% | 91.17% | 91.31% |
| 9 | 90.50% | 90.64% | 90.64% | 90.84% | 90.92% | 91.09% | 90.98% | 91.12% | 91.12% |
| 9.5 | 90.63% | 90.41% | 90.59% | 90.99% | 90.91% | 91.07% | 91.03% | 91.14% | 91.14% |
| 10 | 90.46% | 90.51% | 90.82% | 90.79% | 90.90% | 90.98% | 91.13% | 91.01% | 91.13% |
| 10.5 | 90.62% | 90.58% | 90.79% | 90.89% | 91.07% | 90.82% | 90.83% | 91.05% | 91.07% |
| 12 | 90.46% | 90.55% | 90.75% | 90.65% | 90.84% | 90.80% | 90.77% | 90.80% | 90.84% |
| 12.5 | 90.43% | 90.45% | 90.62% | 90.66% | 90.69% | 90.70% | 90.69% | 90.72% | 90.72% |
| 13 | 90.43% | 90.52% | 90.57% | 90.40% | 90.60% | 90.61% | 90.50% | 90.64% | 90.64% |
| 14 | 90.35% | 90.41% | 90.48% | 90.39% | 90.36% | 90.56% | 90.45% | 90.47% | 90.56% |

Toff (uSec)

Ton (uSec)

*Fig. 6a*

| Row Labels | Toff (uSec) | | | | | | | | | |
|---|---|---|---|---|---|---|---|---|---|---|
| | 0.1 | 0.12 | 0.2 | 0.24 | 0.28 | 0.32 | 0.36 | 0.4 | Grand Total |
| 221 Output Watts | 95.22% | 95.22% | 95.23% | 95.20% | 95.21% | 95.18% | 95.16% | 95.18% | 95.23% |
| 6.8 | 94.89% | 94.87% | 94.81% | 94.80% | 94.78% | 94.73% | 94.70% | 94.66% | 94.89% |
| 7.25 | 94.93% | 94.93% | 94.90% | 94.90% | 94.84% | 94.84% | 94.82% | 94.82% | 94.93% |
| 7.75 | 95.01% | 95.01% | 94.98% | 94.98% | 94.97% | 94.93% | 94.92% | 94.88% | 95.01% |
| 8 | 95.07% | 95.04% | 95.03% | 95.01% | 94.99% | 94.98% | 94.97% | 94.89% | 95.07% |
| 8.25 | 95.06% | 95.07% | 95.06% | 95.07% | 95.02% | 94.98% | 94.97% | 95.03% | 95.07% |
| 8.5 | 95.10% | 95.10% | 95.10% | 95.08% | 95.08% | 95.07% | 95.05% | 95.04% | 95.10% |
| 8.75 | 95.13% | 95.12% | 95.12% | 95.11% | 95.08% | 95.12% | 95.04% | 95.10% | 95.13% |
| 9 | 95.14% | 95.17% | 95.16% | 95.12% | 95.10% | 95.13% | 95.13% | 95.11% | 95.17% |
| 9.5 | 95.19% | 95.20% | 95.19% | 95.17% | 95.15% | 95.14% | 95.16% | 95.12% | 95.20% |
| 10 | 95.20% | 95.21% | 95.23% | 95.19% | 95.18% | 95.17% | 95.15% | 95.10% | 95.23% |
| 10.5 | 95.22% | 95.21% | 95.20% | 95.18% | 95.17% | 95.13% | 95.14% | 95.06% | 95.22% |
| 12 | 95.20% | 95.20% | 95.19% | 95.15% | 95.14% | 95.11% | 95.06% | 95.08% | 95.20% |
| 12.5 | 95.21% | 95.19% | 95.20% | 95.15% | 95.15% | 95.11% | 95.15% | 95.03% | 95.21% |
| 13 | 95.19% | 95.21% | 95.21% | 95.20% | 95.16% | 95.15% | 95.11% | 95.11% | 95.21% |
| 14 | 95.22% | 95.22% | 95.20% | 95.20% | 95.21% | 95.18% | 95.14% | 95.18% | 95.22% |

Ton (uSec)

Fig. 6b

SYSTEMS AND METHODS FOR INCREASING OUTPUT CURRENT QUALITY, OUTPUT POWER, AND RELIABILITY OF GRID-INTERACTIVE INVERTERS

CROSS-REFERENCE TO RELATED APPLICATION

The present invention is a continuation of U.S. patent application Ser. No. 15/614,352, entitled "Systems and Methods for Increasing Output Current Quality, Output Power, and Reliability of Grid-Interactive Inverters", filed Jun. 5, 2017, which is a continuation of U.S. patent application Ser. No. 15/043,240, entitled "Systems and Methods For Increasing Output Current Quality, Output Power, and Reliability of Grid-Interactive Inverters," filed Feb. 12, 2016 and issued on Jul. 4, 2017 as U.S. Pat. No. 9,698,668, which application is a continuation of U.S. patent application Ser. No. 14/329,775, entitled "Systems and Methods for Increasing Output Current Quality, Output Power, and Reliability of Grid-Interactive Inverters," filed Jul. 11, 2014 and issued on Feb. 16, 2016 as U.S. Pat. No. 9,263,936, which application is a continuation of U.S. patent application Ser. No. 13/546,993, entitled "Systems and Methods for Increasing Output Current Quality, Output Power, and Reliability of Grid-Interactive Inverters," filed Jul. 11, 2012 and issued on Jul. 15, 2014 as U.S. Pat. No. 8,780,592, which application claims priority under 35 U.S.C. § 119(e) to U.S. Provisional Patent Application Ser. No. 61/506,343 entitled "Isolated Grid-Tied Inverter Architecture with Combined Signal Processing for Low Current Total Harmonic Distortion," filed Jul. 11, 2011, the disclosures of which are incorporated by reference herein in their entirety.

FIELD OF THE INVENTION

The present invention relates to grid-interactive inverters and more specifically to the current quality, power production, and reliability of grid-interactive inverters.

BACKGROUND

Alternative energy systems can be classified according to whether they are stand-alone systems or grid-connected systems. Mostly, a stand-alone system is used in off-grid applications with battery storage. In a grid-connected system, excess power can be sold to an electric utility or "the Grid", typically in the afternoon hours of the day which happen to coincide with peak rate times. When the grid-connected system is generating less than the consumed amount of power, the Grid continues to supplement the power generated by the alternative energy system.

Grid-interactive inverters (commonly referred to as grid-tie inverters) are a type of power inverter that converts direct current (DC) into alternating current (AC) that is fed to the Grid. Current will flow from the inverter to the Grid when the instantaneous voltage supplied at the inverter outputs exceeds the instantaneous grid voltage.

When a photovoltaic module is the source of the direct current, a grid-interactive inverter inverts a relatively low and variable DC voltage to a relatively high AC voltage that is matched to the Grid. A variety of grid-interactive inverter structures can be utilized in applications involving photovoltaic modules including grid-interactive inverters that are derivatives of a basic H-bridge topology and structures that are derivatives of a neutral point clamped (NPC) topology. A typical grid-interactive inverter includes a stage that converts DC voltage to AC voltage using switches that switch current in a bidirectional manner across the output terminals of the grid-interactive inverter to provide AC to the Grid. The switches are typically implemented using transistors, which are controlled using pulse width modulation (PWM) signals that define the periods of time in which individual transistors are ON or OFF. When the switches are controlled in an appropriate manner and the voltage drop across the output filter is sufficiently large relative to the Grid voltage, the bidirectional flow of current through the output filter results in a sinusoidal current at the output of the grid-interactive inverter that is compatible with the Grid.

In many implementations, the DC voltage received by the grid-interactive inverter does not exceed the peak voltage of the Grid and so a direct DC-AC inversion is not performed. Instead, multiple stages are utilized within the grid-interactive inverter that boost the received DC voltage to a DC voltage exceeding the rectified voltage of the Grid, and invert the boosted DC voltage to provide AC to the Grid. A common technique for boosting the DC voltage received from a photovoltaic module is to convert the DC to AC and to utilize an appropriately wound transformer to step the AC voltage up to a higher voltage. The stepped up AC output can be full wave rectified to provide a DC voltage to the DC-AC inverter stage that exceeds the peak voltage of the Grid. In many implementations, the DC-DC conversion stage utilize switches that switch current in a bidirectional manner through the primary coil of a transformer. The output of the secondary coil can then be full wave rectified to accumulate charge on a DC link capacitor. The DC link capacitor serves as an energy buffer. The peak current draw on the DC link capacitor by the DC-AC inverter stage typically exceeds the current provided to the DC link capacitor by the DC-DC conversion stage. Therefore, the DC link capacitor stores enough charge to meet the peak current draw of the DC-AC inverter stage and enable power to be exported by the grid-interactive inverter throughout each grid cycle. The switching of current through the primary coil of the transformer by transistors in the manner outlined above can be controlled using PWM control signals. As can readily be appreciated, the AC in a DC-DC conversion stage need not have a frequency and/or phase matched to the Grid. Instead, the frequency and/or phase of the AC can be determined based upon the performance of the DC-DC conversion stage.

The PWM control signals that drive the switches in the various stages of a grid-interactive inverter are typically generated by a controller that monitors the Grid voltage and adjusts the switching of the DC-AC inverter stage to produce a current compatible with the Grid. The presence of a controller within a grid-interactive inverter can enable other functionality targeted at improving the efficiency and/or power output of the inverter. For example, photovoltaic modules typically have a non-linear output efficiency that can be represented as an I-V curve. The I-V curve provides information concerning the current that the inverter should draw from the photovoltaic module to obtain maximum power. Maximum power point tracking is a technique involving application of a resistive load to control the output current of a photovoltaic module and maximize power production.

Micro-inverters are a class of grid-interactive inverter that converts a DC voltage from a single photovoltaic module to an AC voltage. A key feature of a micro-inverter is not its small size or power rating, but its ability to perform maximum power point tracking to control on a single panel.

Micro-inverters are commonly used where array sizes are small and maximizing performance from every panel is a concern.

Where panels are connected in series, a string inverter can be utilized. A benefit of connecting panels in series in this way is that the DC voltage provided to the string inverter can be sufficiently high so as to exceed the peak grid voltage. As noted above, a single stage inverter can be utilized when the DC input voltage exceeds the peak grid voltage. Typically, a single stage inverter is more efficient than a multiple stage inverter due to energy losses that occur in DC-DC conversion stages associated with the transformer and switching losses. String inverters are typically used with larger arrays of photovoltaic modules.

SUMMARY OF THE INVENTION

Various enhancements to grid-interactive inverters in accordance with embodiments of the invention are disclosed. One embodiment includes input terminals configured to receive a direct current, output terminals configured to provide an alternating output current to the utility grid, a controller, an output current sensor, and a DC-AC inverter stage comprising a plurality of switches controlled by control signals generated by the controller. In addition, the controller is configured to generate control signals that cause the switches in the DC-AC inverter stage to switch a direct current in a bidirectional manner across output terminals of the grid-interactive inverter to provide an alternating current to the utility grid, the controller is configured to measure the alternating output current provided to the utility grid using the output current sensor, the controller is configured to perform frequency decomposition of the output current to determine the magnitude of a plurality of unwanted current components; and the controller is configured to generate control signals that cause the switches in the DC-AC inverter stage to switch current in a bidirectional manner across the output terminals in a way that the magnitude of each of the plurality of unwanted current components is subtracted from the resulting output current.

BRIEF DESCRIPTION OF THE DRAWINGS

FIGS. 5a and 5b illustrating the bidirectional switching of current through a primary coil of a transformer in a DC-DC conversion stage of a grid-interactive inverter.

FIG. 5c illustrates the ON and OFF states of MOSFETS in a grid-interactive inverter during the bidirectional switching of current through a primary coil of a transistor.

FIGS. 6A and 6B are charts showing variation of efficiency of a grid-interactive inverter based upon the duty cycle and switching frequency of a DC-DC conversion stage at different output power levels.

DETAILED DESCRIPTION

Figure 1:
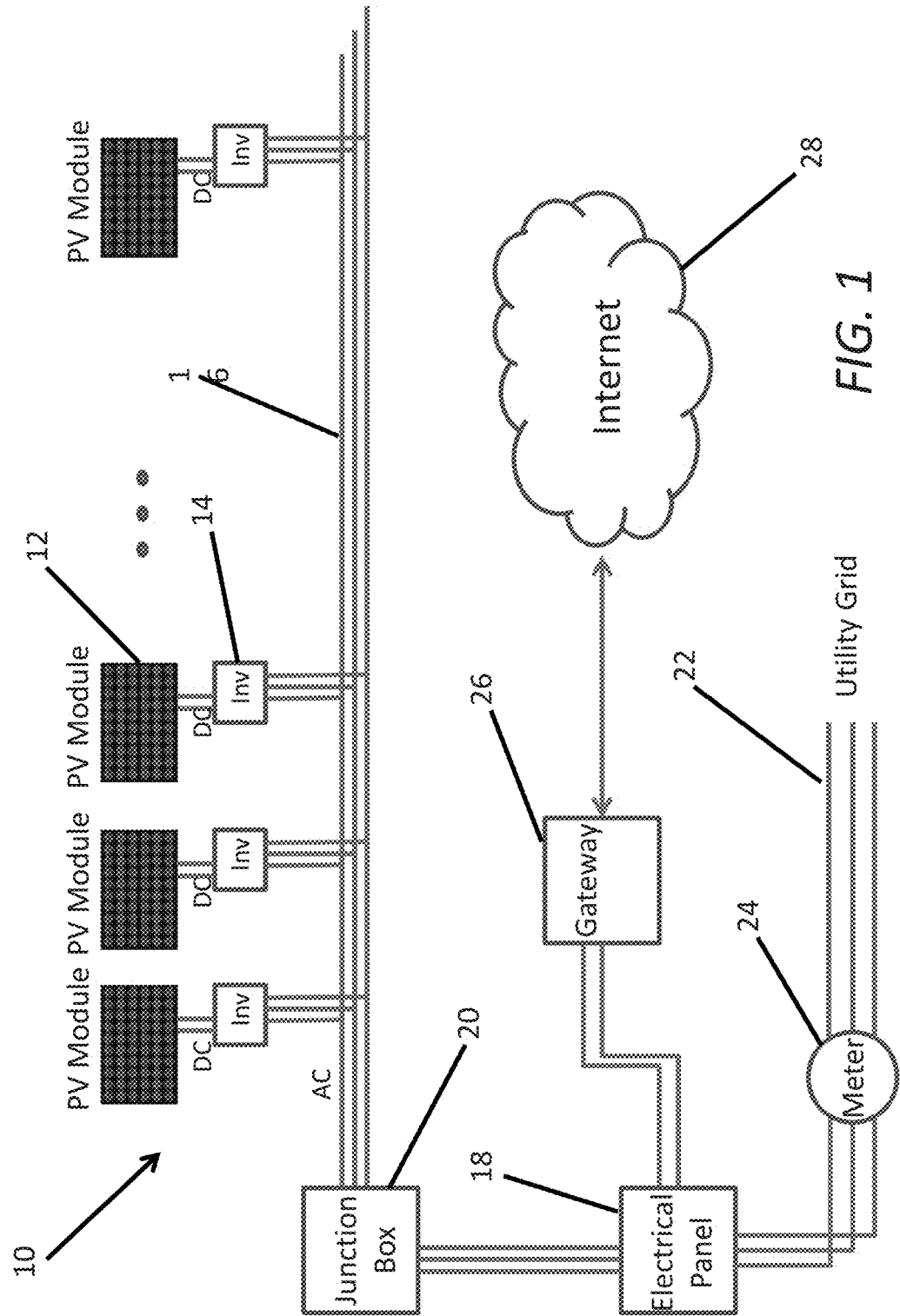
FIG. 1 is a system diagram of a power generation system in accordance with an embodiment of the invention.

Turning now to the drawings, various enhancements to grid-interactive inverters in accordance with embodiments of the invention are illustrated. A variety of systems and methods are discussed that can be utilized in any of a variety of grid-interactive inverter topologies to improve output current quality, power production and/or reliability. Grid-interactive inverters in accordance with embodiments of the invention can include some or all of the enhancements depending upon the topology of the grid-interactive inverter and/or the requirements of the specific application. Indeed, many of the enhancements are appropriate in a variety of applications including for use in micro-inverters and string inverters.

In a number of embodiments, the output current quality of a grid-interactive inverter is improved by configuring the grid-interactive inverter to perform harmonic cancellation in the output current provided to the Grid. Grid-interactive inverters are typically expected to supply "clean" power to the Grid. The degree to which current supplied by a grid-interactive inverter is clean can be quantified by a measure called total harmonic distortion, which is the ratio of the power of the current in the fundamental (typically 50 or 60 Hz) component divided by the sum of the power in the output current that is due to other components up to the 40th harmonic of the fundamental. The grid is rarely a perfect sinusoid and there are non-linearities in the output filters of most grid-interactive inverters. Therefore, driving the switches in a DC-AC inverter stage of a grid interactive inverter with control signals that produce a perfect sinusoidal voltage across the output filter of the inverter will not in general result in a perfect sinusoidal current being provided to the Grid from the output of the inverter. Accordingly, grid-interactive inverters in accordance with embodiments of the invention perform harmonic cancellation to reduce the power in the output current due to components other than the fundamental component. In several embodiments, harmonic cancellation is achieved by performing frequency decomposition of the observed output current waveform from the grid-interactive inverter. In several embodiments, the frequency decomposition is performed using a Fast Fourier Transform (FFT). The magnitude of each of the components (other than the fundamental component) can be determined and the PWM control signals modified to subtract the unwanted components from the observed output current waveform. In this way, the total harmonic distortion of the current supplied by a grid-interactive inverter can be significantly reduced.

In many embodiments, the power output of a grid-interactive inverter that includes a DC-DC conversion stage is increased using real time control of the switching times in the DC-DC conversion stage. The power generated by a photovoltaic module can depend upon a variety of factors including (but not limited to) the time of day, shade, temperature and the point on the I-V curve of the photovoltaic module on which it is operating. As is discussed further below, the output power and/or efficiency achieved by a grid-interactive inverter that includes a DC-DC conversion stage can be significantly increased by controlling the switching times of the transistors within the DC-DC conversion stage based upon the input power level, the output power level, and our the efficiency of the grid-interactive inverter. In several embodiments, a controller within the grid-interactive inverter can select switching times based upon a look up table. In a number of embodiments, a controller within a grid-interactive inverter can select switching times using a real time optimization such as (but not limited to) a steepest descent optimization. In this way, the overall power output of the grid-interactive inverter under any given operating conditions can be increased and/or the efficiency of the DC-DC conversion stage within the grind-interactive inverter can be optimized.

In several embodiments, the power output of a grid-interactive inverter that receives an input voltage from a photovoltaic module is increased by controlling the power point of the photovoltaic module based upon the maximum power output of the grid-interactive inverter instead of by performing maximum power point tracking. When the power output of a photovoltaic module is diminished (e.g. at the beginning and end of each day), then the operating power point of the photovoltaic module that maximizes the power output of the grid-interactive inverter may not be the maximum power point of the photovoltaic module. When a grid-interactive inverter includes a DC-DC conversion stage, the output DC voltage is a fixed ratio of the input DC voltage determined by the windings of the transformer in the DC-DC conversion stage. At low output power, DC-AC inverter stages typically operate more efficiently at lower input DC voltages (and therefore low DC link voltages) due to lower switching losses. Therefore, operating a photovoltaic module at a lower voltage than the maximum power point can increase the efficiency of a grid-interactive inverter, where the reduction in switching losses in the inverter offsets the reduction in power output by the photovoltaic module. Accordingly, controlling the input voltage to the grid-interactive inverter to maximize power output to the Grid in accordance with embodiments of the invention can achieve increased power output relative to performing maximum power point tracking.

In several embodiments, grid-interactive inverter reliability is increased by utilizing circuits that limit inrush currents when the Grid interactive inverter is first connected to the Grid, circuits that perform startup power check to prevent the grid-interactive inverter from attempting to supply power to the Grid until sufficient power is available at the inverter's input, and/or a controller that monitors for overcurrent events and disconnects the output drive of the grid-interactive invertor in response to an overcurrent event. In many embodiments, the performance of grid-interactive inverters can be monitored using power line communication between the grid-interactive inverters and a gateway connected to an electrical panel. In a number of embodiments, the Grid voltage is utilized by the grid-interactive inverter for symbol time alignment and error correction codes are used to correct packet errors resulting from impulse noise events in the Grid and inverter-generated noise.

Grid-interactive inverters and processes for improving output current quality, power production and/or reliability in accordance with embodiments of the invention are discussed further below.

Power Generation Systems

Power generation systems in accordance with embodiments of the invention include power generators, such as (but not limited to) photovoltaic modules, that generate a DC voltage. The DC voltage can be converted to AC and supplied to the Grid via a grid-interactive inverter. The grid-interactive inverter can be a micro-inverter or a string inverter. In power generation systems that utilize micro-inverters, the micro-inverters can communicate with a gateway via the power line in accordance with embodiments of the invention.

A power generation system incorporating micro-inverters in accordance with embodiments of the invention is illustrated in FIG. 1. The power generation system 10 includes one or more photovoltaic modules 12 that are connected via a grid-interactive inverter 14 to power lines 16, which connect to an electrical panel 18 via a junction box 20. The grid-interactive inverters are micro-inverters that convert DC to AC for supply to the Grid 22. In a number of embodiments the AC is supplied to the Grid via a meter 24 that can be used to measure the amount of current supplied to the Grid and/or consumed by other devices connected to the electrical panel (not shown).

In many embodiments, the grid-interactive inverters 14 are configured to communicate with a gateway 26. The grid-interactive inverters 14 can provide status information to the gateway 26 and the gateway can provide control information and/or additional information including (but not limited to) firmware updates to the grid-interactive inverters. Systems and methods for communicating via power lines in accordance with embodiments of the invention are discussed further below.

Although specific power generation systems are discussed above with respect to FIG. 1, any of a variety of power generation systems in accordance with embodiments of the invention can be utilized including power generation systems that incorporate different types of power generators. In addition, power generation systems in accordance with embodiments of the invention can incorporate grid-interactive inverters that are string inverters. The manner in which grid-interactive inverters can provide increased output current quality, power production and/or reliability in a power supply system in accordance with embodiments of the invention is discussed further below.

Grid-Interactive Inverters

Grid-Interactive Inverters in accordance with embodiments of the invention can be constructed using any conventional grid-interactive inverter topology. Any of a variety of enhancements can be incorporated within the topology in accordance with embodiments of the invention to increase output current quality, power production and/or reliability. Specific enhancements that can be incorporated into a grid-interactive inverter in accordance with embodiments of the invention are discussed further below with respect to the generalized multi-stage grid-interactive inverter conceptually illustrated in FIG. 2. As can readily be appreciated, the enhancements are not limited to use with grid-interactive inverters similar to the inverter illustrated in FIG. 2 and can be utilized in any of a variety of grid-interactive inverter topologies as appropriate to the requirements of a specific application.

Figure 2:
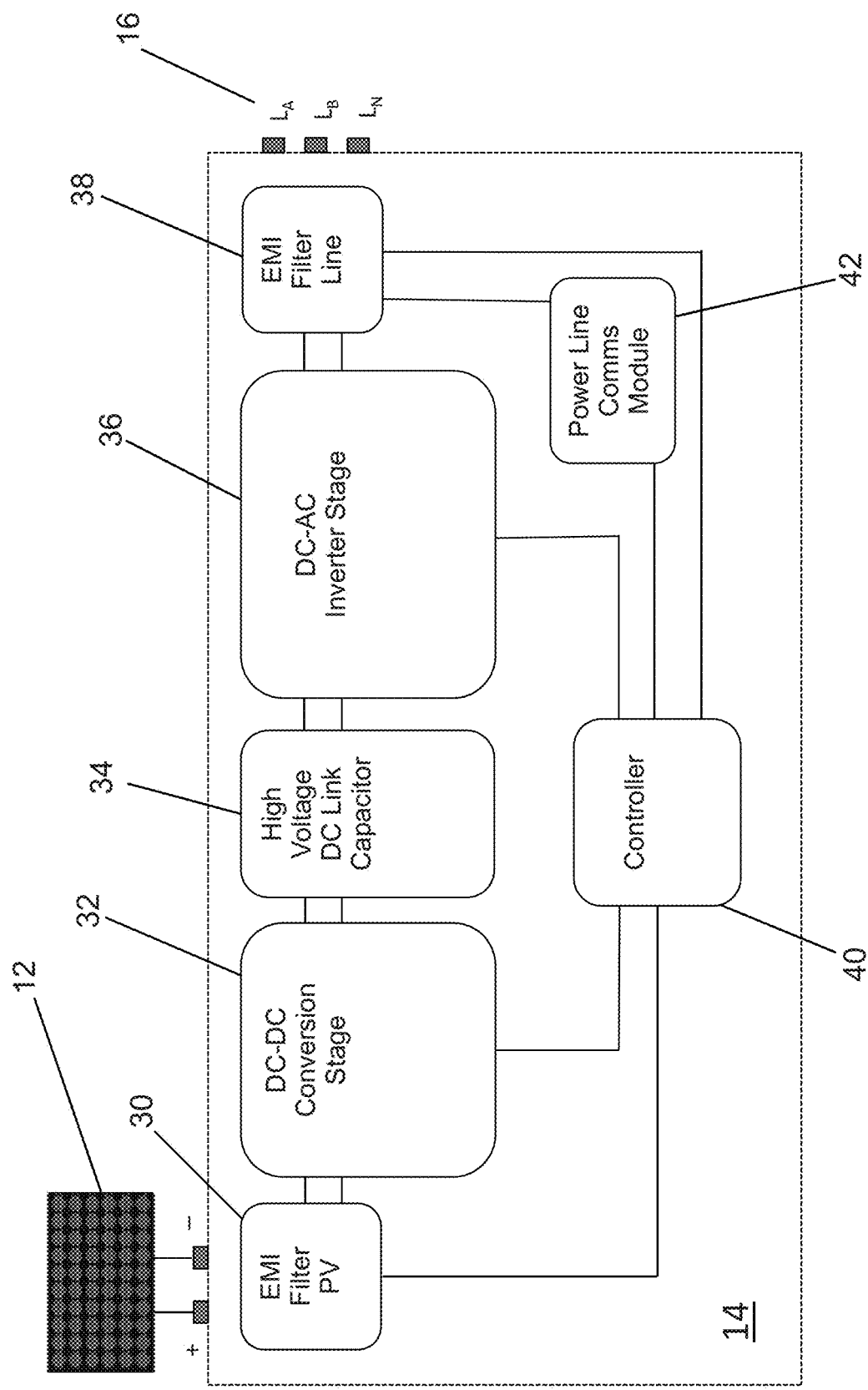
FIG. 2 is a circuit diagram of a grid-interactive inverter in accordance with an embodiment of the invention.

A generalized circuit diagram of a multi-stage grid-interactive inverter in accordance with an embodiment of the invention is illustrated in FIG. 2. The grid-interactive inverter 14 receives a DC input from a photovoltaic module 12 via input terminals and provides an AC output to a set of power lines 16 via output terminals. In the illustrated embodiment, the grid-interactive inverter 14 includes a filter 30 that is configured to reduce the impact of electromagnetic interference that can back-propagate from the switching DC-DC converter onto the wires that connect the inverter to the panel. Without such a filter, unacceptable levels of radiated emission on the DC lines may result. The current received from the photovoltaic module is provided to a DC-DC conversion stage 32 that provides current to a high voltage DC link capacitor 34 at a voltage in excess of the peak voltage of the Grid. The high voltage DC link capacitor 34 provides current to a DC-AC inverter stage 36. The AC output of the DC-AC inverter stage 36 is filtered by a passive filter 38 to eliminate electromagnetic interference prior to providing the AC to the Grid via the power lines 16. This low pass filter has a corner frequency that is several orders of magnitude higher than the low frequency grid waveform. The AC switching produces a tremendous amount of high frequency noise that would propagate onto the local grid if not rejected by this filter.

A controller 40 controls the switching in the DC-DC conversion stage 32 and the DC-AC inverter stage 36. As discussed further below, the controller 40 can be configured to improve the quality of the output current by controlling the switching in the DC-AC inverter stage 36 to perform harmonic cancellation. The controller 40 can also be configured to improve the power output of the grid-interactive inverter by controlling the switching in the DC-DC conversion stage to minimize power losses based upon the power output of the photovoltaic module 12. In many embodiments, the controller 40 also increases the power output of the grid-interactive inverter by controlling the output voltage of the photovoltaic module to maximize power output (as opposed to performing maximum power point tracking). In a number of embodiments, the controller 40 can prevent damage to the components of the grid-interactive inverter by monitoring for overcurrent events and disconnecting the output drive of the DC-AC inverter from the Grid.

As can be readily appreciated, a variety of sensors are utilized in conjunction with the controller to perform the above functionality. In several embodiments, a grid-interactive inverter 14 includes sensors that enable the controller to measure input and output current, measure input and output voltage, and detect Grid voltage zero crossings. In a number of embodiments, the grid-interactive inverter 14 also includes a temperature sensor. In other embodiments, any of a variety of sensors appropriate to the requirements of a specific application can be utilized.

As noted above, grid-interactive inverters in accordance with embodiments of the invention can communicate with each other and/or a gateway via the power lines to which the inverter is connected. In the illustrated embodiment, the grid-interactive inverter 14 includes a power line communication module 42 that handles the transmission of symbols via the power lines 16.

Although specific grid-interactive inverters are discussed above with respect to FIG. 2, any of a variety of grid-interactive inverters can be utilized in accordance with embodiments of the invention. The specific control processes and circuits that can be incorporated into grid-interactive inverters in accordance with embodiments of the invention to achieve increased output current quality, power production and/or reliability in accordance with embodiments of the invention are discussed further below.

Current Control and Harmonic Cancellation

Grid-interactive inverters in accordance with embodiments of the invention can incorporate controllers that control the switching in a DC-AC inverter stage to perform harmonic cancellation. In a number of embodiments, harmonic cancellation is achieved by observing the output current of the grid-interactive inverter and performing a frequency decomposition of the observed current. The controller can then control the switching of the DC-AC inverter stage to subtract the magnitude of the unwanted components from the output current. In this way, the controller can reduce the total harmonic distortion in the output of the grid-interactive inverter. The process of performing harmonic cancellation effectively involves creating a feedback loop that subtracts unwanted components from the output current.

In several embodiments, harmonic cancellation is performed using a feedback loop that performs a frequency decomposition of the presently observed output current waveform:

$$Sobs(t) = \sum_{k=0}^{Max-1} (\alpha_k + j\beta_k) f_k(t) + \eta(t)$$

where $f_k(t) = \sin(2\pi(k+1)f_0 t)$;

$f_0 = 50$ or $60$ Hz

A vector that feeds back an iteratively accumulated superposition that opposes the harmonic content in Sobs(t) is constructed below:

$$Sharmonic(t) = \sum_{k=0}^{Max-1} (\tilde{\alpha}_k + j\tilde{\beta}_k) f_k(t) + \eta(t)$$

where $\tilde{\alpha}_0 = 1$

At each iterative time-step, the values of $\tilde{\alpha}_k$ and $\tilde{\beta}_k$ can be updated to increment or decrement in a direction with the same sign to that of $a_k$ and $\beta_k$. Negative feedback is achieved by subtracting the array built from this superposition from the observed vector Sobs(t). The magnitude of the harmonic correction array is also scaled by the magnitude of the observed array and the entire correction vector can be scaled by a constant that varies with the output power of the inverter:

PWM$_{correction}(t)$=$Kp$(power)[Sobs($t$)−Sharmonic($t$)
  *Max(Sobs($t$))]

This array is passed through a low pass filter (implemented, for example, as an exponential moving average (EMA)) to bandwidth limit the rate of change and then added to what would otherwise be the default sinusoidal PWM control signal as follows:

PWMout($t$)=[1+EMA(PWM$_{correction}(t)$)]sin($2\pi f_0 t$)

Figure 3:
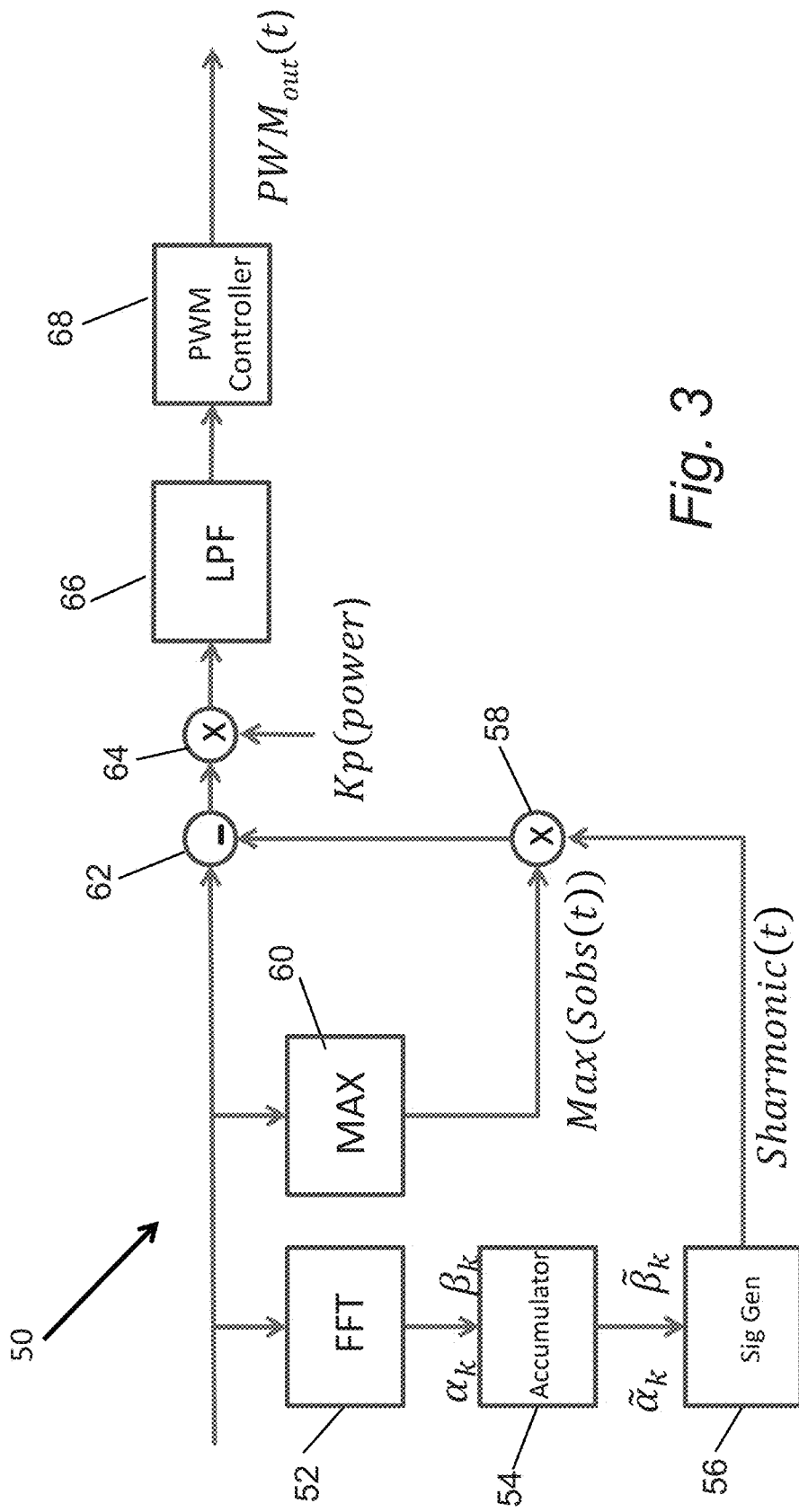
FIG. 3 is a process diagram illustrating a harmonic cancellation feedback loop in accordance with an embodiment of the invention.

A harmonic correction current control loop that can be utilized in a variety of grid-interactive inverters in accordance with an embodiment of the invention is illustrated in FIG. 3. The observed current signal enters from the left and is operated on by a FFT block 52. The FFT block provides coefficients $\alpha_k$ and $\beta_k$ which are then input to an accumulator (54) to produce $\bar{\alpha}_k$ and $\bar{\beta}_k$. $\bar{\alpha}_k$ and $\bar{\beta}_k$ form the basis weights for the signal Sharmonic(t) generated by the signal generator 56, which is multiplied (58) by the maximum observed value of the input current vector (60). The difference (62) between the resulting processed vector and the incoming current observation is then weighted (64) by a constant Kp(power) that is a function of the output power of the inverter. The resulting error term is then low pass filtered (66) and directly applied to the PWM control module (68) in order to drive the switching transistors of the DC-AC inverter in such a way as to reduce the power in the cancelled components of the observed output current.

Figure 4:
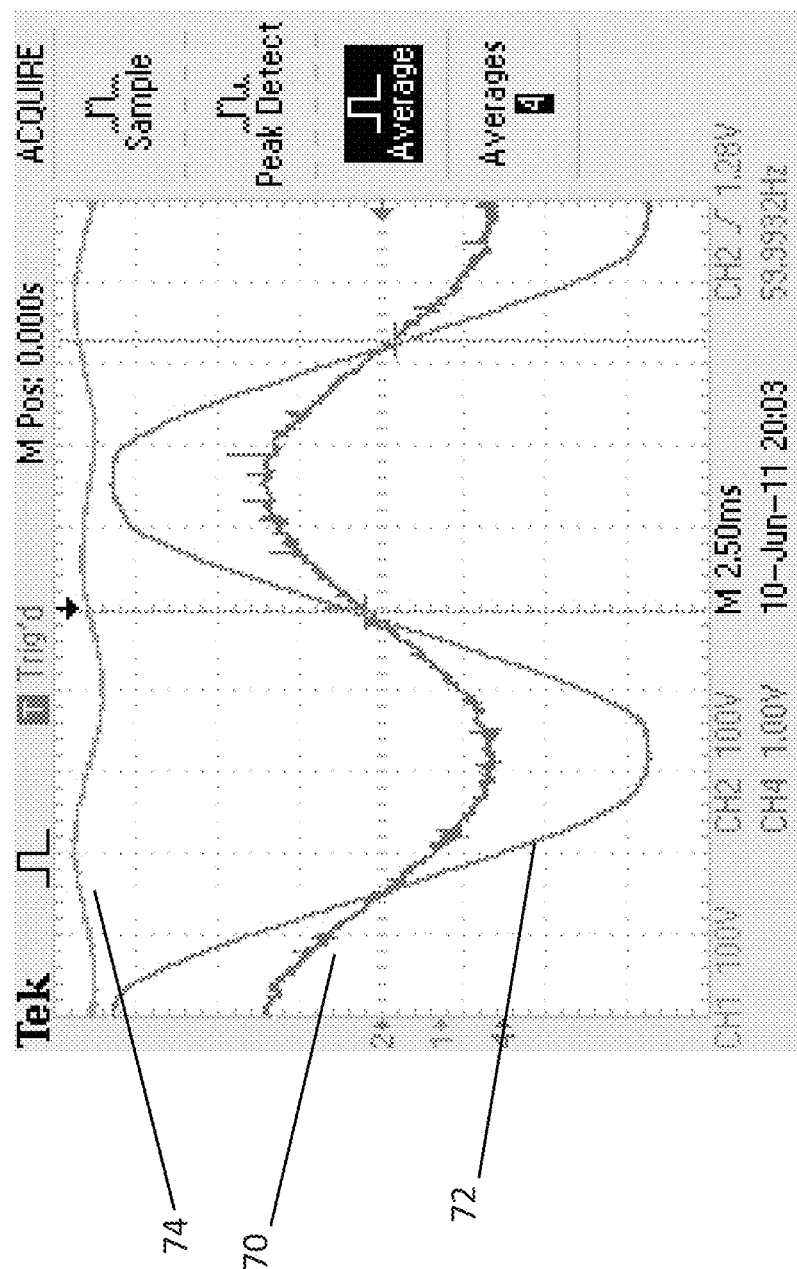
FIG. 4 is a graph illustrating an output current waveform generated using harmonic cancellation in accordance with an embodiment of the invention.

Results associated with the current control PWM loop are shown in FIG. 4. The output current 70 is shown as the lower amplitude, centered curve. The measured total harmonic distortion of the signal is less than 2%. The grid voltage 72 is also shown (high amplitude centered curves). Inspection of the Grid voltage 72 reveals that its shape is not completely sinusoidal and exhibits distortion particularly near crests and troughs of the wave-shape.

The chart in FIG. 4 also illustrates the voltage 74 across the high voltage DC link capacitor of the grid-interactive inverter. The high voltage DC link capacitor acts as an energy buffer. During periods in which peak output current is provided to the Grid, the charge accumulated on the capacitor drops and the voltage drop across the capacitor is reduced. During periods in which the output current drops, charge accumulates on the capacitor. Two charging and discharging cycles occur with respect to the high voltage DC link capacitor for each cycle of the Grid. Due to the fact that energy buffering is performed at high voltage (i.e. after the DC-DC conversion), the capacitance of the high voltage DC link capacitor can be lower than the capacitance that would be used to store an equivalent amount of energy at a lower voltage (e.g. where the energy buffering capacitor is located prior to the DC-DC conversion stage). Energy stored in a capacitor scales linearly with capacitance, but quadratically with voltage. Therefore, a 10 times increase in voltage in the DC-DC conversion can result in a 100 times drop in the amount of capacitance used to buffer energy within the grid-interactive inverter. Accordingly, highly reliable capacitors such as (but not limited to) polypropylene metal film capacitors can be utilized to implement the high voltage DC link capacitor. Such capacitors are typically rated for longer useful lifespan than higher capacitance capacitors that utilize higher dielectric materials such as gel-based electrolytic capacitors.

In embodiments where a full-bridge output architecture is utilized within a grid-interactive inverter, the inverter design allows 'four-quadrant' operation of voltage and current waveforms. This means that the inverter can be configured to supply reactive current to the Grid in order to offset local reactive load demands. It also means that it is possible to draw power from the Grid, for instance at times of day when energy is inexpensive, in order to rectify AC to DC for the purpose of charging a battery. Supplying reactive current to the Grid using the feedback loop outlined above can simply be a matter of altering the objective function of the harmonic current cancellation such that the resulting corrected waveshape meets the desired leading or lagging power factor. This is achieved by selecting a ratio of the fundamental (50 or 60 Hz) real, $I_{fund}$, and imaginary, $Q_{fund}$, amplitudes such that $PF_{desired} = \cos(\text{Angle}(I_{fund}/Q_{fund}))$.

Although specific harmonic cancellation processes and grid-interactive inverters configured to perform harmonic cancellation are discussed above with reference to FIGS. 3 and 4, any of a variety of harmonic cancellation processes can be implemented within a grid-interactive inverter in accordance with an embodiment of the invention. Controlling switching in a DC-DC conversion stage of a grid-interactive inverter in accordance with embodiments of the invention is discussed further below.

Increasing Output Power by Controlling Switching of DC-DC Converters

DC-DC conversion stages utilized in many grid-interactive inverters include two half-bridge (high and low side) MOSFET devices joined by the primary coil of a transformer. The secondary coil of the same transformer can be rectified and the resulting higher voltage charge stored on a DC link capacitor. In many embodiments of the invention, a controller within the grid-interactive inverter performs real-time switching optimization (frequency and duty cycle) of the DC-DC full bridge switching transistors in order to increase the efficiency of the inverter. A variety of techniques can be utilized to determine the frequency and duty cycle of the switching including (but not limited to) table based and steepest descent approaches.

The efficiency of a transformer in a DC-DC conversion stage is typically a function of frequency at a given power level. Switching losses that increase with the frequency, however, can also impact the efficiency of a DC-DC conversion stage. Accordingly, at any given operating power an optimal combination of switching frequency and duty cycle exists. As is discussed further below, a controller can determine the output power of a photovoltaic module and generate control signals that control the switching frequency and/or duty cycle of the switching transistors to achieve an increase in efficiency.

The full-bridge switching of current through the primary coil of a transformer in a DC-DC conversion stage in order to lift panel voltage (typically between 20 and 40 Vdc) to a higher voltage (e.g. between 340 and 630 Vdc) is illustrated in FIGS. 5a and 5b. The periods of time in which each pair of transistors is ON and OFF are determined by a PWM signal provided to the gates of the transistors. A PWM control signal is conceptually illustrated in FIG. 5c. The two key parameters in the PWM control signal are Ton and Toff. The sum of these two parameters sets the switching frequency and the ratio Ton/Ton+Toff defines the duty cycle. FIGS. 5a and 5b show the two on-state operating modes of the full bridge. The time interval Ton.a indicates that current flows from the upper left switching device, through the primary coil of the transformer, to the lower right switching device. The time interval Ton.b indicates that current flows from the upper right switching device through the primary coil of the transformer to the lower left switching device. Ton.a=Ton.b, the 'a' or 'b' designator simply indicates the path of current flow.

In several embodiments, an improvement in overall inverter efficiency can be achieved if Ton and Toff are varied depending on the power. Tables showing variation in efficiency of a grid-interactive inverter based upon the duty cycle and switching frequency of the DC-DC conversion stage at different output power levels are illustrated in FIGS. 6a and 6b. For each power level, a matrix of values for Ton and Toff was tested. Ton values were varied across 15 values from 6.8 to 14 uSec and Toff varies across 8 values from 0.1 to 0.4 uSec. All 120 pairwise combinations are tested for overall efficiency at the two different output power levels. As can be readily appreciated by a comparison of FIGS. 6a and 6b, an optimal frequency and duty cycle exists. In addition, the optimal frequency and duty cycle varies with the output power delivered to the Grid by the grid-interactive inverter. Accordingly, a controller can be configured to modify the switching frequency and duty cycle of the PWM control signal provided to the transistors within a DC-DC conversion stage to increase efficiency based upon the output power of the inverter. In several embodiments, the controller determines frequency and duty cycle based upon a look up table. In many embodiments, the controller performs a steepest descent process to continuously locate the most efficient frequency and duty cycle for the DC-DC conversion stage.

Figure 7:
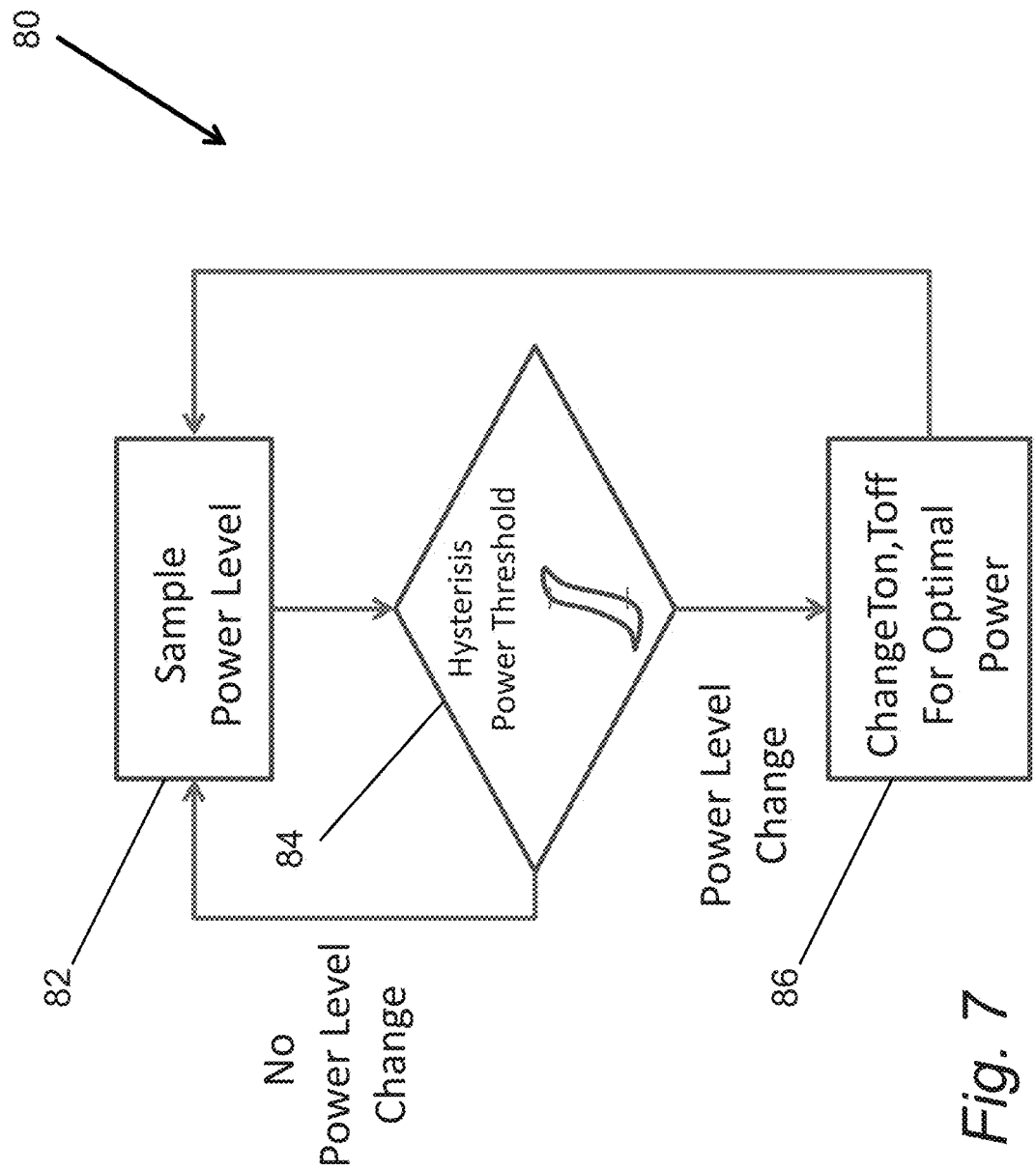
FIG. 7 is a flow chart illustrating a process for changing the switching frequency and/or duty cycle of a DC-DC conversion stage in response to changes in the output power generated by a grid-interactive inverter that includes hysteresis in accordance with an embodiment of the invention.

A process for modifying the switching frequency and duty cycle of a DC-DC conversion stage of a grid-interactive inverter using a lookup table in a manner that incorporates hysteresis in accordance with embodiments of the invention is illustrated in FIG. 7. The process 80 commences by sampling (82) the power level. The sampled power level is compared (84) to a threshold. In the illustrated embodiment, the threshold has hysteresis so as to prevent a rapid set of changes in Ton, Toff if an inverter continued to operate near a switching boundary of two power levels. Specifically, a change occurs when the inverter output power exceeds a threshold by some margin in both the increasing and decreasing power level directions in order for a change to occur. Once a change has been detected (84), then a look up table is used to find the best Ton, Toff pairwise combination for the new level of interest and the Ton, Toff pairwise combination is used to control (86) the switching of the DC-DC conversion stage. As can be readily appreciated, an arbitrary number of power levels can be implemented.

Although the processes discussed above with respect to FIG. 7 use look up tables to determine a Ton, Toff pairwise combination for a given power output level, a variety of real time optimization processes can be implemented in accordance with embodiments of the invention to determine an appropriate Ton, Toff pairwise combination. In several embodiments, a steepest descent method is used to periodically update Ton, Toff. In this method, perturbation steps are taken in 4 directions, shorter and longer Ton combined with shorter and longer Toff. The resulting pair with the highest efficiency is then held. In many embodiments, the grid-interactive inverter is able to measure its own efficiency using input and output voltage and current sensors. Additional perturbation steps can be taken and the process continues indefinitely. Local minima are avoided in the technique with a jump step that moves the Ton, Toff pairwise combination more than a single step away. As can be seen from FIGS. 6a and 6b, local minima are not common and can easily be managed with this technique. In other embodiments, any of a variety of processes for selecting Ton, Toff pairwise combinations in real time to improve the efficiency of a grid-interactive inverter can be utilized as appropriate to the requirements of specific applications in accordance with embodiments of the invention.

Maximum Power Point Tracking

Photovoltaic modules provide different power in different points of their volt-ampere (I-V) characteristic. The point in the I-V curve where output power is maximum is called the maximum power point (MPP). Micro-inverters are typically designed to assure that a photovoltaic module is operated near its MPP. This is accomplished with a special control circuit in called a MPP tracker (MPPT).

MPPTs in accordance with many embodiments of the invention set the photovoltaic module operating voltage to maximize output power to the Grid. As is discussed further below, at low power the operating voltage that produces the highest output power may not be the MPP. The photovoltaic module operating voltage set point can be set by controlling the conversion ratio between the DC link capacitor and the Grid. The grid voltage is not influenced by the inverter due to the low impedance nature of the Grid itself. Therefore, the conversion ratio, called Gain, between the high voltage DC link capacitor and the Grid serves to set the DC link voltage via the simple relation:

$$V_{DC\_LINK} = \sqrt{2} V_{Grid}/\text{Gain}$$

where Gain is a parameter that ranges from 0.55 to 1 (the lower bound is set by the maximum allowed DC link voltage, which is typically around 620 Volts and is set based upon the requirements of a specific application).

Since the ratio of the photovoltaic module voltage to the DC link is set by the fixed turn ratio of the transformer in the DC-DC conversion stage, the Gain parameter is used to set the photovoltaic module voltage in the system during active export. For example, if the DC-DC transformer has a ratio of 17:1, $V_{grid}$=240 Vrms, and Gain is set to 0.8, then the DC photovoltaic module voltage will be set to $\sqrt{2}*240/(0.8*17)$=25 Volts. This single parameter, Gain, is used to set the photovoltaic module operating voltage such that the photovoltaic module operates at the point where the product of the module's voltage and current is maximized.

In order to continually track the maximum power operating point of the photovoltaic module, the inverter perturbs the Gain parameter and then waits a period of time to observe if the exported power has increased or decreased. If the exported power has increased, then the perturbation continues in the same direction. If the exported power has decreased then the direction is reversed. A key parameter to choose is the perturbation step size of the Gain parameter. In several embodiments of the invention, at least two step sizes are possible. One is relatively small and is used during a 'slow' tracking mode while this other is relatively large and is used during a 'fast' acquisition mode.

In several embodiments, the MPPT switches from slow to fast mode when a deviation in output power above an adaptive threshold is exceeded. This may happen, for example, when a cloud crosses in front of the panel causing total solar insolation to rapidly decline. Conversely, if when in fast mode, only a small change in output power is observed for some time, then the controller switches back to slow mode and again uses relatively small steps of Gain to continue tracking the photovoltaic module's MPP. This hybrid approach between fast and slow with corresponding coarse and fine panel voltage adjustments simultaneously provides excellent dynamic tracking performance and high resolution steady state performance. This means that the MPPT increases the likelihood that the inverter is producing as much power as possible during both static and dynamic insolation scenarios thereby maximizing MPPT efficiency (defined as the ratio of the integral of actual panel output to the integral of ideal panel output).

When photovoltaic module wattage is diminished, for instance at the beginning and end of each day, then it may in fact be the case that the photovoltaic module voltage operating point that maximizes the energy exported to the Grid by a grid-interactive inverter is not the MPP. This is because the grid-interactive inverter operates more efficiently at lower DC link voltages than at higher DC link voltages. This follows from the fact that less energy is lost when switching MOSFET devices in the DC-AC inverter stage across lower voltages. Therefore, when export power is low, there can be a net advantage in total production to operating away from the MPP by forcing the photovoltaic module voltage to be lower than the point that would otherwise be specified by the MPP. In several embodiments, the Gain is set away from the MPP at the beginning and end of each day in order to maximize total production.

Figure 8:
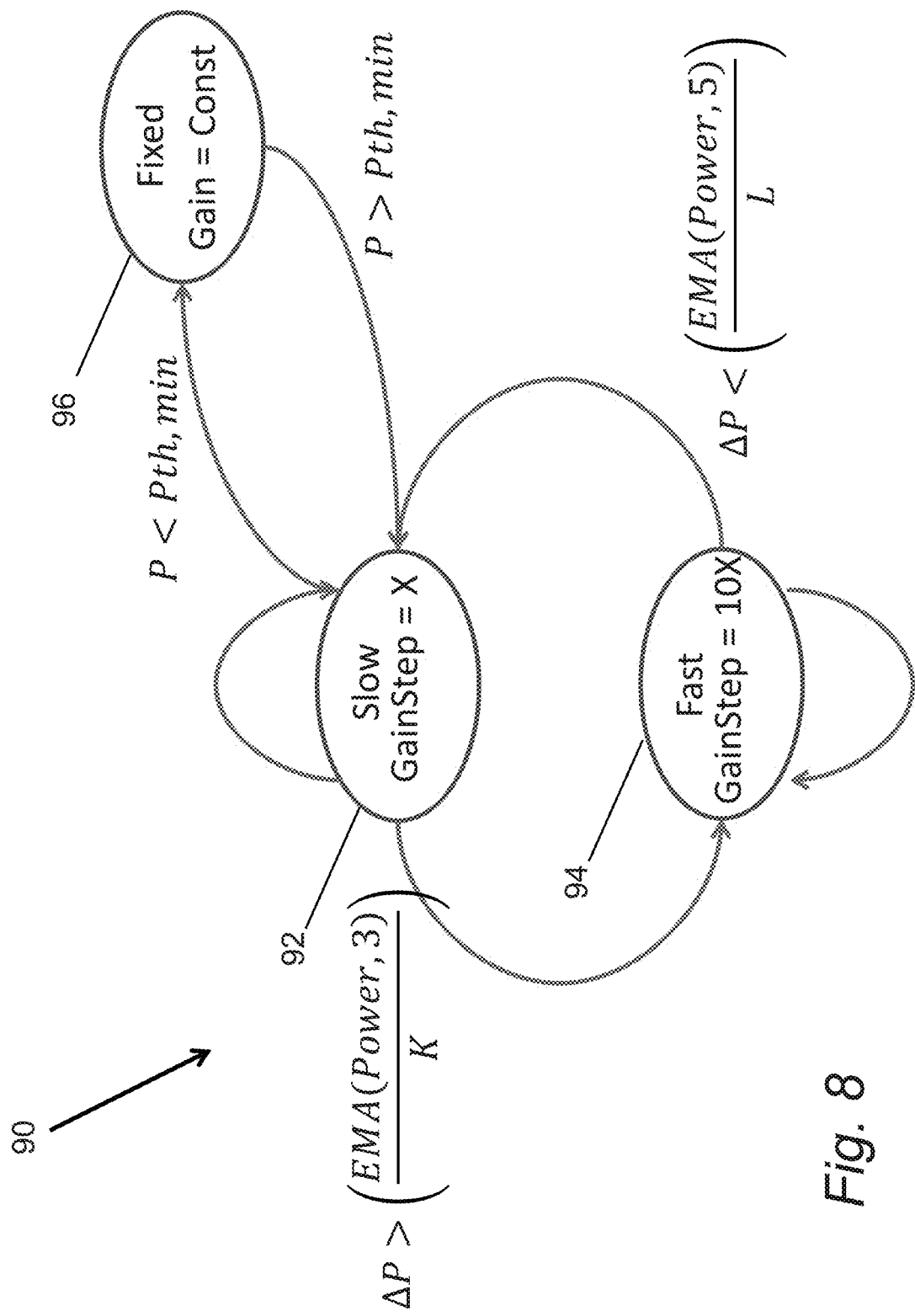
FIG. 8 is a state diagram illustrating a process for performing maximum power point tracking in accordance with an embodiment of the invention.

A process for performing maximum power tracking in accordance with an embodiment of the invention is illustrated in FIG. 8. The process includes both slow (92) and fast (94) tracking states and describes the relative step size of the Gain parameter as being approximately 10× larger in the fast state (94) as compared to the slow state (92). In other embodiments, the step sizes can be dimensioned in a manner appropriate to the requirements of a specific application. In the illustrated embodiment, an exponential moving average (EMA) with exponential parameter $2^{-3}$ is used to construct an adaptive moving threshold to gate a transition from slow to fast mode. A slower average, with EMA exponent $2^{-5}$ is used to set the adaptive level for transition from fast to slow mode. In addition parameters K and L scale the averages and a transition between states occurs based upon whether a power change, ΔP, between perturbation steps exceeds or is less than the scaled average (as appropriate). In other embodiments, any of a variety of transition criterion can be utilized in accordance with the requirements of a specific application.

Finally, if the average power falls below a threshold, then the Gain parameter is set (96) to a constant and the MPPT is effective disabled. This may cause the panel to operate away from the MPP. However, as previously described, this choice yields higher total output power when the absolute power level has fallen below a threshold (e.g. 5 Watts, a case which can last for 20 or 30 minutes at the beginning and end of each day).

Although specific processes for controlling photovoltaic module voltage operating points to maximize power output are discussed above with respect to FIG. 8, any of a variety of processes that involve operating away from the MPP at lower power levels can be utilized as appropriate to the requirements of specific applications in accordance with embodiments of the invention.

Increasing Reliability

A key aspect of grid-interactive inverter design is the expected operational lifetime of the inverter. A variety of stresses can be placed upon the components of a grid-interactive inverter during normal operation that can significantly reduce the expected operational lifetime of the inverter. Various techniques for increasing the reliability of grid-interactive inverters in accordance with embodiments of the invention are discussed further below including circuits configured to limit in rush current when the grid-interactive inverter is first connected to the Grid, circuits that perform startup power check to prevent the grid-interactive inverter from attempting to supply power to the Grid until sufficient power is available at the inverter's input, and/or use of a controller that monitors for overcurrent events and disconnects the output drive of the grid-interactive inverter in response to an overcurrent event.

In Rush Current Limiting Circuits

Grid-interactive inverters in accordance with many embodiments of the invention store energy in a high voltage DC link capacitor having capacitance on the order of 10's to 100's of micro-Farads. Instantaneous application of grid voltage to the output of a DC-AC inverter stage (before the output drive is engaged) can cause the body diodes of the switching MOSFETs in the DC-AC inverter stage to become forward biased such that the voltage applied across the terminals of the link capacitor equals √2Vgrid. With a 240 Vrms grid, for example, 340 Vdc can be instantly applied across the terminals of the link capacitor. This can result in tremendous inrush current if allowed to operate unabated. To mitigate this inrush, an inrush current limiting circuit can be utilized.

Figure 9:
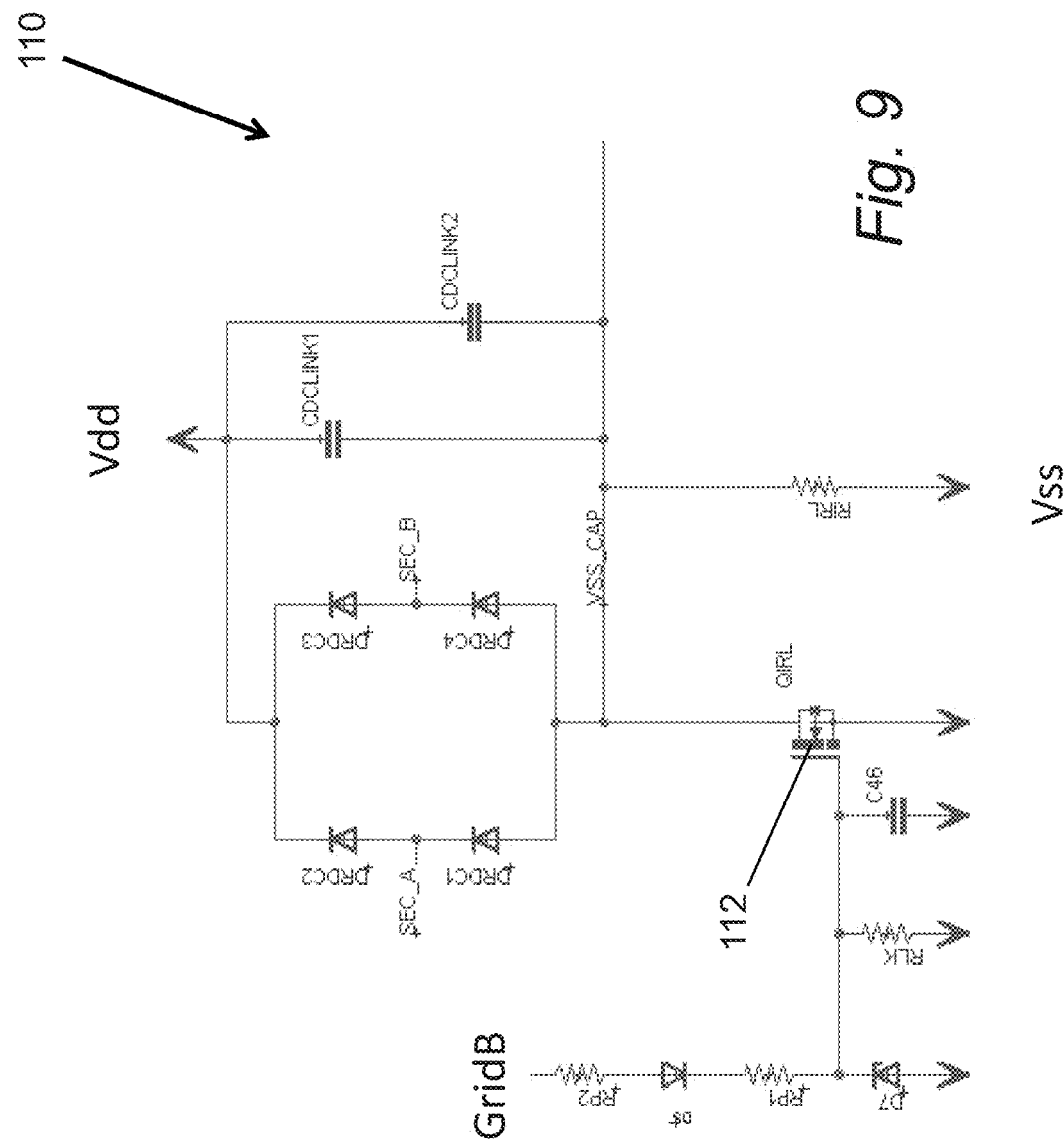
FIG. 9 is a circuit diagram illustrating an inrush current limiting circuit in accordance with an embodiment of the invention.

An inrush current limiting circuit in accordance with an embodiment of the invention is illustrated in FIG. 9. The inrush current limiting circuit 110 operates in a completely passive manner and requires no active micro-processor control. This is important in as much as the AC connection to grid may be made prior to the DC connection to a panel (used to power the microprocessor) or may be made at night. The on-state resistance of the MOSFET power transistor 112 is an order of magnitude smaller than that of the negative thermal coefficient (NTC) devices that are typically used to limit inrush current. Similarly, the initial off-state resistance of the overall inrush limiter can be set several orders of magnitude higher than that of the initial off-state resistance of an NTC device. This means that both the initial inrush limit and the final active resistance are dramatically better than that of an NTC device.

In the illustrated embodiment, at the time of initial connection, the rectified Grid voltage is applied across points Vdd,Vss and the current that flows through the DC link capacitor is limited by the relatively high resistance value of 113. Meanwhile, the capacitor 114 is slow charged through resistors 115 while the gate of transistor 112 is protected with diodes 116. Component values are scaled such that the rate of charge of capacitor 114 slower than the rate of charge of the DC link capacitors. This ensures that the link capacitors are sufficient charged to prevent inrush current above a given amperage threshold before transistor 112 enters a fully saturated cony state. This activity happens only when the inverter goes from a state of being disconnected to connected to the Grid. The circuit is fully autonomous and improves the reliability of the inverter by protecting components from inrush currents during connection events throughout the lifetime of the device.

Although a specific inrush current limiting circuit is illustrated in FIG. 9, any of a variety of current inrush limiting circuits appropriate to the requirements of specific applications can be utilized in accordance with embodiments of the invention. Processes for further increasing reliability of grid-interactive inverters by using startup power checks in accordance with embodiments of the invention are discussed further below.

Startup Power Check

Grid-interactive inverters including (but not limited to) micro-inverters have active components that are powered via energy supplied from the photovoltaic panel rather than the Grid. This means there is a causality issue associated with starting export at the beginning of a day some period after sunrise. The inverter, for example, draws a minimum of W watts when it connects to the Grid. When the panel is not able to supply W watts and an attempt to connect to the Grid is made, then an immediate brown-out event will likely occur in which the main supply voltage from the panel drops below the necessary voltage to provide minimum expected voltage regulation to various circuits within the grid-interactive inverter. When this occurs the inverter immediately disconnects from the Grid due to sensing a panel voltage low event. The connection instance of the inverter to the Grid (switching the AC drive from a passive to active state) invariably results in some amount of current rush until all internal loops have stabilized. This rushing AC current is not catastrophic, but it places additional stress on components that should be avoided if possible. Hence it is desirable to have only a single grid connection event per day. In many embodiments, a power check circuit is utilized to determine whether the photovoltaic module is generating sufficient power to support connection of the grid-interactive inverter to the Grid. The power check circuit is a circuit incorporated within the grid-interactive inverter that enables the inverter to measure the power being generated by a photovoltaic module and make a determination concerning whether there is sufficient power to start providing power to the Grid.

Figure 10:
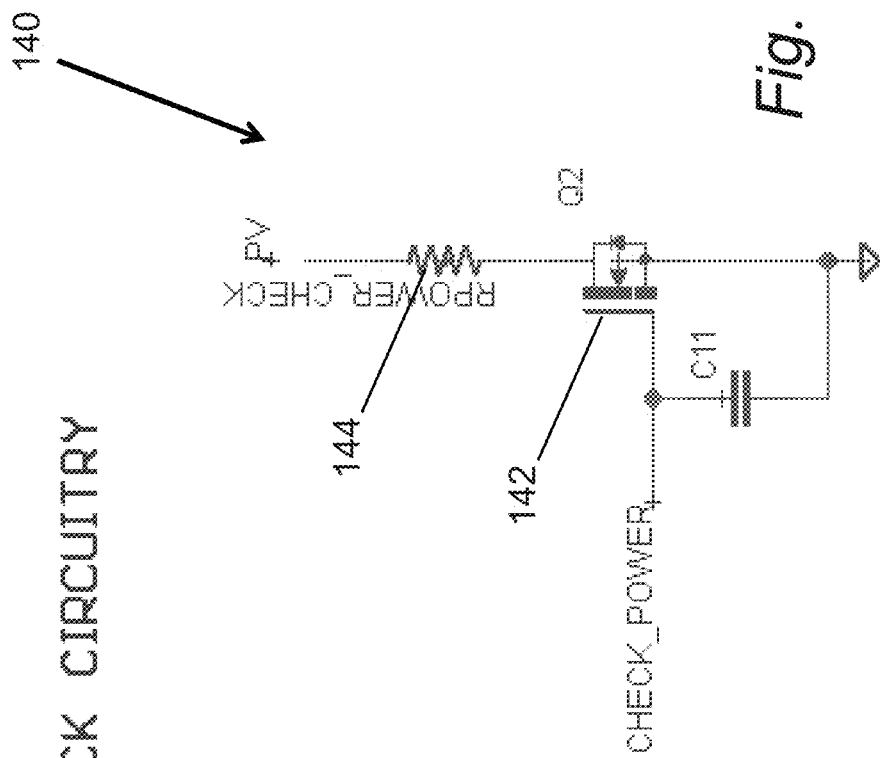
FIG. 10 is a circuit diagram illustrating a startup power check circuit in accordance with an embodiment of the invention.

A power check circuit in accordance with an embodiment of the invention is illustrated in FIG. 10. The power check circuit 140 switches on prior to the decision to engage the AC and DC drives of the grid-interactive inverter. The power check circuit operates by connecting (though a power MOSFET 142) a fixed resistance 144 in parallel across the supply terminals of the panel. The resistor 144 is scaled such that $R_{pow\_check}=V^2_{min}/P_{min}$. In this equation, $V_{min}$ is the minimum operational panel voltage and $P_{min}$ is the minimum inverter consumption when grid interactive under export of 0 watts of power. Connecting the resistor 144 and then checking that the voltage on the panel remains above $V_{min}$ provides an indication that enough power is being generated by the panel for a successful grid-connection event to occur without occurrence of a brown-out. If power check passes, then the AC and DC drives are enabled sequentially one after the other. Next, maximum power point tracking begins. If at any point an AC Over Current event or the Panel voltage drifts too low, then the AC and DC drives are enabled and the power check procedure is re-initiated.

Although a specific power check circuit is illustrated in FIG. 10, any of a variety of circuits can be incorporated within a grid-interactive inverter to check the output power generated by a photovoltaic module in accordance with embodiments of the invention. Processes for increasing the reliability of grid-interactive inverters by performing real-time overcurrent protection in accordance with embodiments of the invention are discussed further below.

Real-Time Overcurrent Protection

Figure 11A:
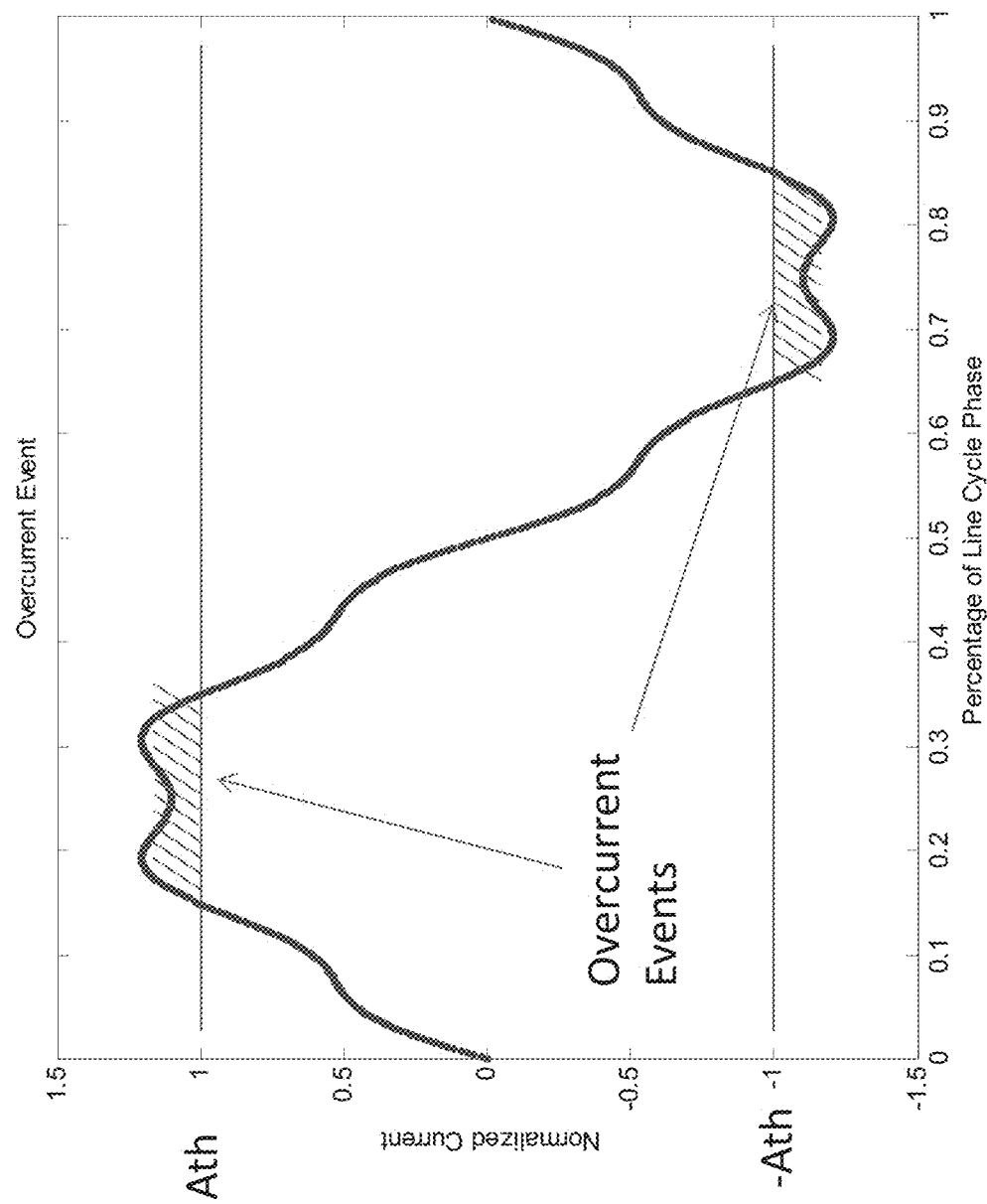
FIG. 11a is a chart illustrating detection of an overcurrent event in accordance with an embodiment of the invention.

Grid-intertie involves real-time maintenance of a nearly constant impedance between the high voltage DC link capacitor and the present grid voltage at all phases of any given line cycle. The output AC drive switching PWM control signal generated by the controller within the grid-interactive inverter sets this impedance and controls the rate of current flow from the high voltage DC link capacitor to the relatively lower voltage Grid. The Grid, however, is a very low impedance source itself, and if for any reason a mismatch occurs between the inverter output and the Grid voltage, then very large currents can rush into or out of the inverter. Reasons for these mismatches include Grid-instabilities such as instantaneous voltage or phase changes. An overcurrent event can be defined as an event in which the sensed AC output current exceeds a predetermined threshold, $|A_{th}|$. Overcurrent events in accordance with this definition are illustrated in FIG. 11a.

Figure 11B:
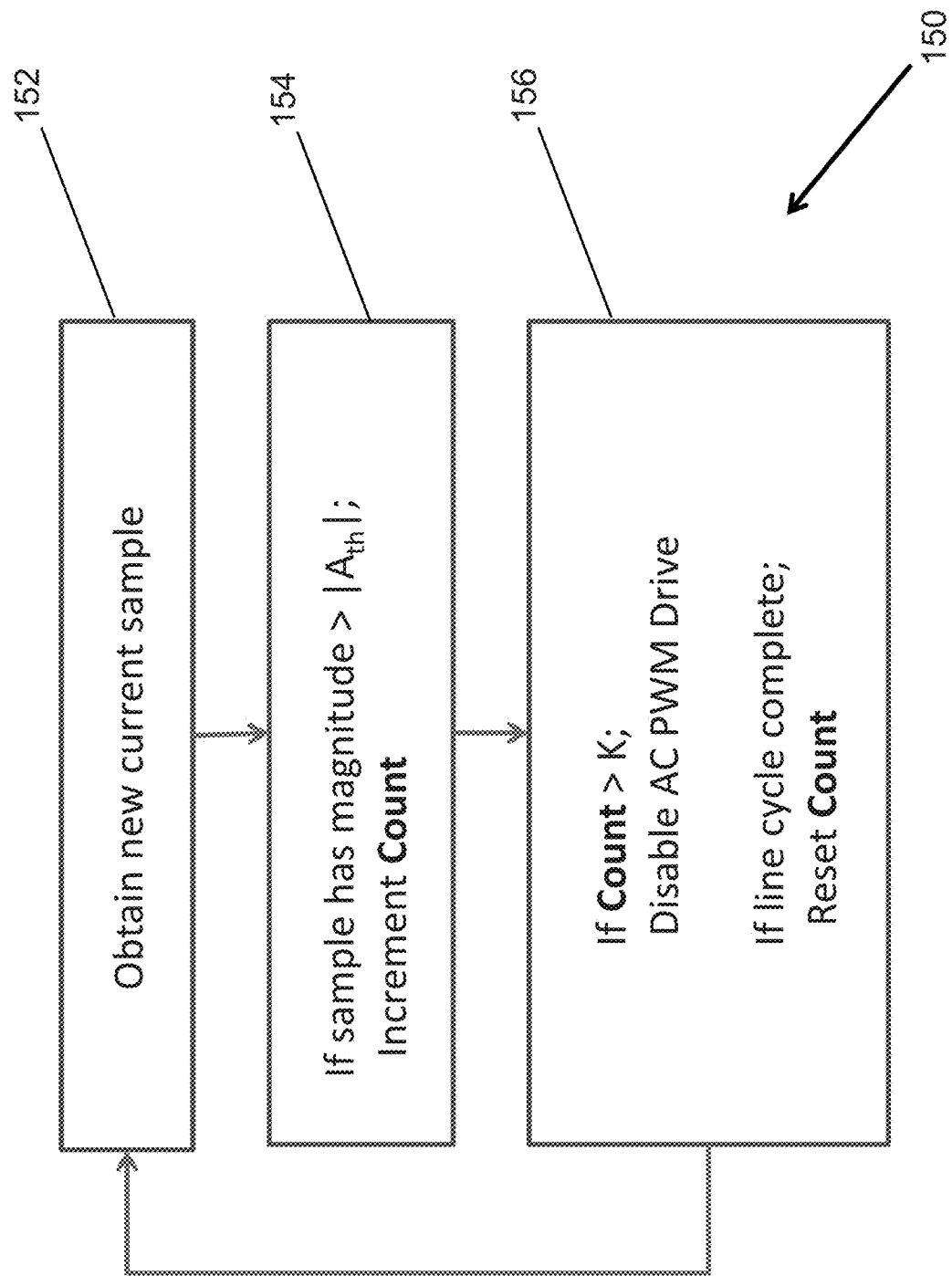
FIG. 11b is a flow chart illustrating a process for performing overcurrent protection in accordance with an embodiment of the invention.

To protect the inverter output-stage from overcurrent events, the output drive of the grid-interactive inverter can be immediately disconnected by simultaneously setting all MOSFET gates to a low state within the DC-AC inverter stage. A process for disconnecting the output drive of a grid-interactive inverter in response to over current events in accordance with an embodiment of the invention is illustrated in FIG. 11b. The process 150 is continuously operating as a background process when the controller of a grid-interactive inverter is active. A current sample is obtained 152, a determination is made concerning whether the sample has a value in excess of the predetermined threshold, $|A_{th}|$. In the event that the current exceeds the predetemined threshold, then a count is incremented 154. Any combination of more than K over-current events causes the output drive to immediately disconnect 156. A disconnect of the AC drive means that all output MOSFET gates are set to a low state simultaneously. This sends any residual current through the body diodes of each MOSFET and initiates a passive connection to the Grid in which the output drive simply rectifies the Grid voltage to the high voltage DC link capacitor. In this mode no current flows from the Grid to the inverter's high voltage DC link capacitor once the DC link voltage is equal to or greater than the peak AC voltage. Once current ceases to flow, the inverter is protected from any further grid anomaly that may occur.

Although specific processes for providing overcurrent protection are discussed above with reference to FIGS. 11a and 11b, any of a variety of processes can be utilized to sample current and disconnect the output drive of a grid-interactive inverter in accordance with embodiments of the invention. A description of typical operation flow in which various processes and circuits discussed above can be used in combination to improve the performance and reliability of the grid-interactive inverter is described below.

Daytime Flow

Due to variation in solar insolation throughout the day-to-day operation of a grid-interactive inverter, the grid-interactive inverter will experience periods in which a photovoltaic module provides negligible power, provides lower power sufficient to start the grid-interactive inverter, and provides high power. Various processes are described above for achieving additional power production during the low power operation of a grid-interactive inverter and for preventing harm to the grid-interactive inverter as it transitions from ON to OFF states.

Figure 12:
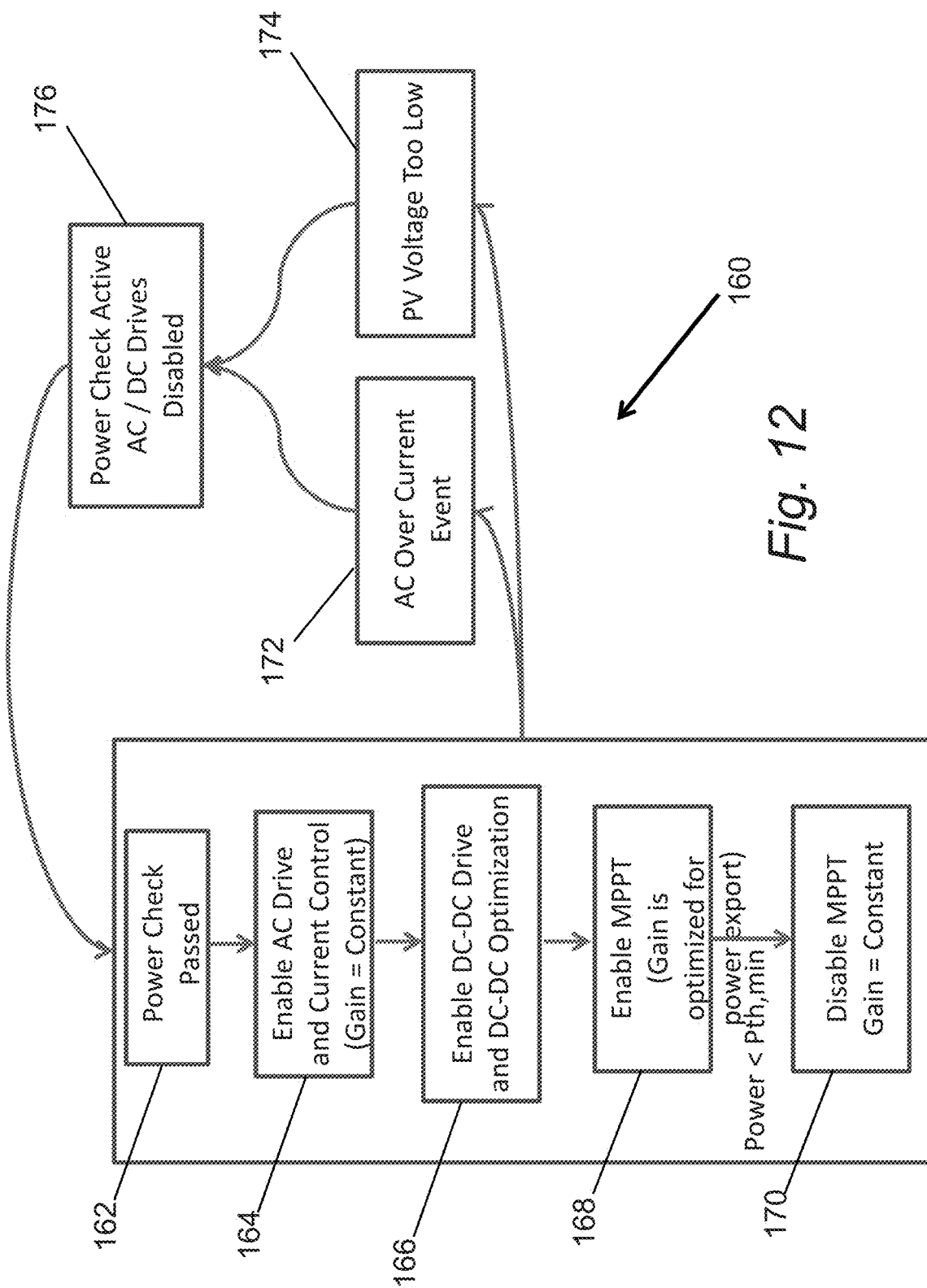
FIG. 12 is a flow chart illustrating a process for modifying the operation of a grid-interactive inverter as the output power of a photovoltaic module fluctuates in accordance with embodiments of the invention.

A flow chart illustrating various processes performed during the day-to-day operation of a grid-interactive inverter in accordance with embodiments of the invention is illustrated in FIG. 12. The process 160 commences when the photovoltaic module produces sufficient power that the power check is passed (162) and so the grid-interactive inverter can commence supplying power to the Grid without risk of brown out. At which point, a controller within the grid-interactive inverter commences sending control signals to the switches within the DC-AC inverter to enable (164) the AC drive and current control functionality of the grid-interactive inverter. Due to the low power produced during the photovoltaic module during the initial start up phase, the Gain of the grid-interactive inverter is set to a constant. The controller can then start providing (166) control signals to start driving the DC-DC conversion stage and adjusting the frequency and duty cycle of the DC-DC conversion stage switching to increase the output power of the inverter. As the power output by the photovoltaic module increases, the MPPT is enabled (168) and the Gain of the grid-interactive inverter is optimized for power export (i.e. no longer constant). As power drops, the MPPT is disabled (170) and the Gain is fixed to a constant until such time as the power output of the photovoltaic necessitates shutting down the grid-interactive inverter.

Throughout the operation of the process shown in FIG. 12, a background process is performed to determine (172) whether an over current event has occurred and/or (174) whether the voltage of the photovoltaic module has dropped to a value that is too low to continue providing power to the Grid. In the event that either event occurs, the controller ceases driving the DC-DC conversion stage and the DC-AC inverter stage. In addition, the power check circuit can be activated.

Although specific processes for managing the exporting of power to a grid using a grid-interactive inverter during the day-to-day operation of a photovoltaic module are discussed above with reference to FIG. 12, any of a variety and/or combination of processes appropriate to the requirements of a specific application can be utilized to manage the operation of a grid-interactive inverter in accordance with an embodiment of the invention.

Power Line Communication

In several embodiments, grid-interactive inverters include the capability of communicating via the power lines to which the inverters are connected. Communicating over the Grid using power lines as a medium involves careful consideration for noise while at the same time necessitating a simple implementation to allow for low cost. Some features of the Grid as a communication medium can assist in reducing cost. In several embodiments, the Grid is used for symbol time alignment. The grid phase is known to all inverters by way of a zero crossing detection and phase lock tracking. Recovered grid frequency and phase can be divided into an equal number of segments at each inverter. These segments can be used to define symbol time boundaries as subsets of each line cycle frequency and phase.

In a number of embodiments, the grid-interactive inverter utilizes a multi-rate on-off keying power line communication physical layer and media access control protocol. In several embodiments, the physical layer of the protocol provides a series of different rates that are achieved by increasing or decreasing the signal constellation density on each line cycle. Forward error correction can also be integrated. In other embodiments, any of a variety of communication protocols can be utilized in accordance with embodiments of the invention. The manner in which forward error correction can be integrated to reduce the number of packet errors that occur when communicating via power lines in accordance with embodiments of the invention is discussed further below.

Use of Error Correction Codes

Figure 13:
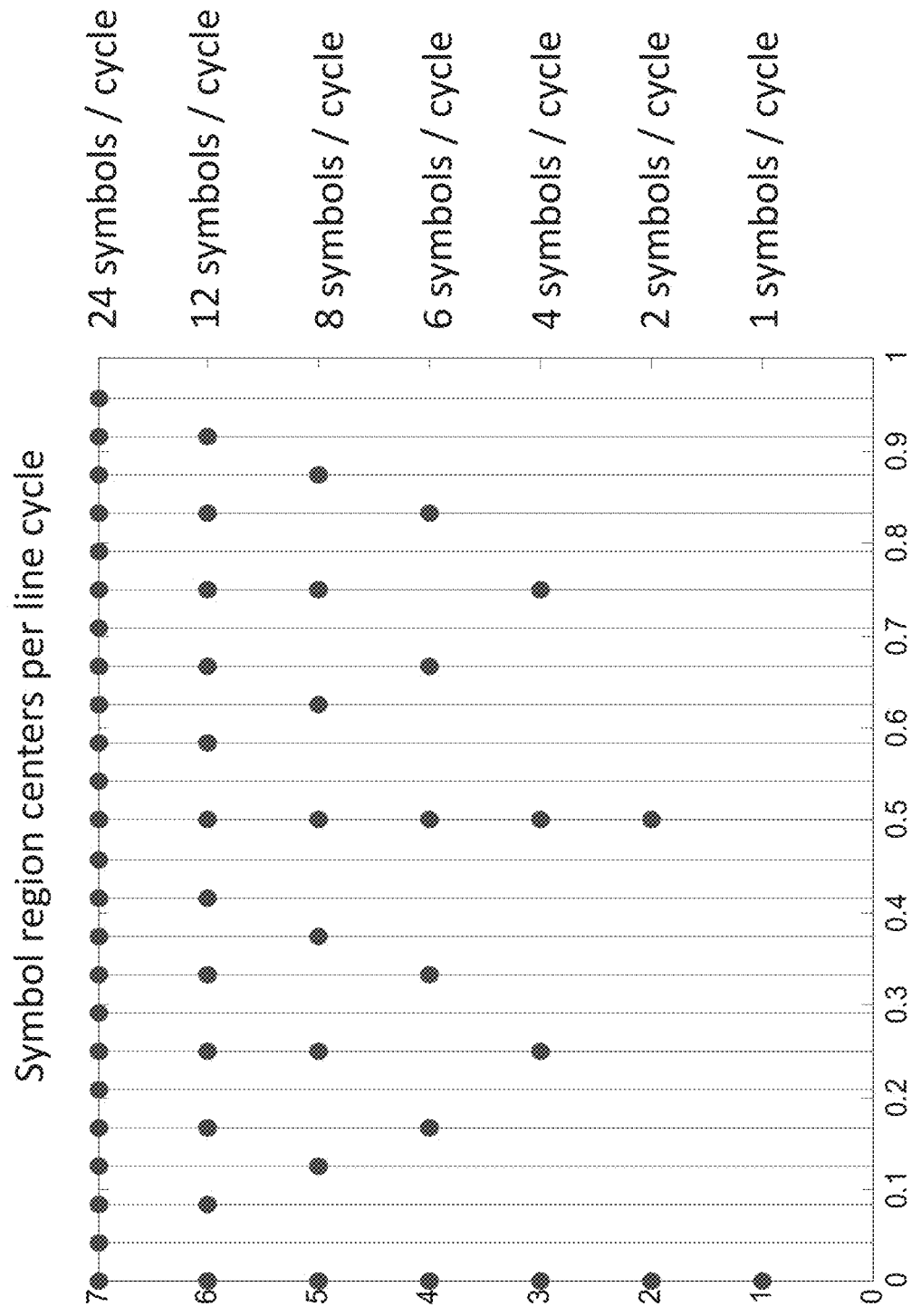
FIG. 13 illustrates symbol regions during a grid cycle.

Impulse noise events in the Grid and inverter-generated self-noise invariably lead to symbol flips that can lead to packet errors. Error correction code can be utilized to increase link reliability. In several embodiments, a (24, 12) Golay error correcting code is utilized that conveys 12 bits of information for each 24 total transmitted bits and can correct up to 3 possible errors. In a number of embodiments, length 24 symbol Golay codewords are transmitted over a span of $\{1, 2, 3, 4, 6, 12, 24\}$ line cycles. This corresponds to $\{24, 12, 8, 6, 4, 2, 1\}$ transmission regions per line cycle. Note that the pairwise product of the corresponding elements of each of the above arrays always equals 24 (the number of symbols per Golay codeword) and that both arrays include the set of integer divisors of 24. The effective user data rate (no parity) for each of these divisors is $\{720, 360, 240, 180, 120, 60, 30\}$ bits per second. The seven separate transmit symbol constellations corresponding to the transmission rates above are illustrated in FIG. 13. In the figure the relative phase of a line cycle from 0 to 1 (0 to $2\pi$) is displayed on the x axis. Then for each of the seven rates per line cycle, the center position of each possible symbol is displayed on the y axis.

This adaptive rate approach provides up to $10 \log 10(720/30)=13.8$ dB of signal to noise ratio gain from the highest to lowest rate. The combination of grid aligned symbol synchronization, Golay forward error correction, and adaptive rate modulation form a powerful yet low complexity implementation to achieve robust communication over the power line medium.

Although specific error correction methods are discussed above with respect to Golay error correction code, any of a variety of error correction processes appropriate to the requirements of specific applications can be utilized in accordance with embodiments of the invention. Furthermore, the communication protocol need not adapt and can simply involve transmitting at a fixed rate using grid aligned symbol synchronization.

While the above description contains many specific embodiments of the invention, these should not be construed as limitations on the scope of the invention, but rather as an example of one embodiment thereof. Accordingly, the scope of the invention should be determined not by the embodiments illustrated, but by the appended claims and their equivalents.

What is claimed:

1. A grid-interactive inverter configured to receive direct current and to provide alternating current to a grid, comprising:
    input terminals configured to receive a direct current;
    output terminals configured to provide an alternating output current to the grid;
    a controller;
    at least one sensor capable of measuring alternating output current provided to the grid;
    a DC-AC inverter comprising a plurality of switches controlled by control signals generated by the controller;
    wherein the controller is capable of generating the control signals that cause the plurality of the switches in the DC-AC inverter to switch a direct current in a bidirectional manner across output terminals of the grid-interactive inverter to provide an alternating output current to the grid;
    wherein the controller is capable of dynamically generating the control signals that cause the plurality of the switches in the DC-AC inverter to switch current in a bidirectional manner across the output terminals in response to the measured alternating output current to provide reactive current to the grid.

2. The grid-interactive inverter of claim 1, wherein the DC-AC inverter is an H-bridge inverter comprising four MOSFETs configured to receive PWM control signals from the controller, where the PWM control signals configure the four MOSFETs to switch current in a bidirectional manner through an output filter connected to the output terminals of the grid-interactive inverter.

3. The grid-interactive inverter of claim 1, wherein the controller is configured to perform frequency decomposition of the measured alternating output current by performing a Fast Fourier Transform of the measured output current.

4. The grid-interactive inverter of claim 1, further comprising:
    a startup power check circuit connected to the input terminals of the grid-interactive converter and comprising at least one resistor connected in series with a switch between the input terminals; and
    an input voltage sensor configured to measure the voltage across the input terminals;
    wherein the controller is configured to determine a minimum input power that can be supplied by a photovoltaic module connected to the input terminals by measuring a voltage across the input terminals of the grid-interactive inverter when the switch is configured to permit current to flow through the at least one resistor connected in series between the input terminals.

5. The grid-interactive inverter of claim 1, wherein the controller is configured to sample an output current sensor and turn off the plurality of the switches in the DC-AC inverter in response to a predetermined number of the samples within a grid cycle having magnitudes exceeding an overcurrent threshold.

6. The grid interactive inverter of claim 1, wherein:
the at least one sensor comprises an output current sensor;
the controller is capable of measuring alternating output current provided to the grid using the output current sensor;
the controller comprises a current control loop capable of performing frequency decomposition of the alternating output current in order to generate feedback to the controller; and
the controller is capable of using the feedback to generate the control signals that cause the plurality of the switches in the DC-AC inverter to switch current in a manner that results in the alternating output current waveform meeting a desired leading or lagging power factor.

7. The grid interactive inverter of claim 1, wherein the controller is capable of dynamically generating the control signals that cause the plurality of the switches in the DC-AC inverter to achieve four-quadrant operation of the alternating output current and voltage waveforms.

8. The grid-interactive inverter of claim 1, further comprising:
a DC-DC converter comprising a plurality of switches connected to a primary coil of a transformer, and a full bridge rectifier connected to an output of a secondary coil of the transformer, where the plurality of switches in the DC-DC converter are controlled by the control signals generated by the controller; and
a DC link capacitor configured to link the DC-DC converter and the DC-AC inverter;
wherein the controller is configured to generate control signals that cause the plurality of the switches in the DC-DC converter to switch the direct current received via the input terminals in a bidirectional manner across the primary coil of the transformer;
wherein the transformer is wound so that the output voltage of the secondary coil is greater than the input voltage of the primary coil; and
wherein the DC link capacity or provides a direct current to the DC-AC inverter.

9. The grid-interactive inverter of claim 8, wherein the DC link capacitor is a polypropylene metal film capacitor.

10. The grid-interactive inverter of claim 8, further comprising:
an output voltage sensor;
wherein the controller is capable of making a power measurement of the alternating output current provided to the utility grid using the output current sensor and the output voltage sensor; and
wherein the controller is configured to select a new switching frequency and duty cycle for the plurality of the switches in the DC-DC converter based upon at least the measured power of the alternating current provided to the utility grid.

11. The grid interactive inverter of claim 10, further comprising:
an input current sensor; and
an input voltage sensor;
wherein the controller is capable of making a power measurement of the direct current received via the input terminals of the grid-interactive inverter; and
wherein the controller is further configured to select the new switching frequency and duty cycle for the plurality of the switches in the DC-DC converter based upon the ratio of the measured power of the direct current received via the input terminals to the measured power of the alternating output current provided to the utility grid.

12. The grid-interactive inverter of claim 10, wherein the controller is further configured to select the new switching frequency and duty cycle for the plurality of the switches of the DC-DC converter based upon the measured power of the alternating output current provided to the grid using a look up table.

13. The grid-interactive inverter of claim 11, wherein the controller is further configured to select the new switching frequency and duty cycle for the plurality of the switches of the DC-DC converter by perturbing at least one of the frequency and duty cycle of the plurality of the switches in the DC-DC converter and making a power measurement of a resulting alternating output current to determine whether an increase in the ratio of the measured power of the direct current received via the input terminals to the measured power of the alternating output current provided to the grid results.

14. The grid-interactive inverter of claim 8, wherein the controller is configured to perform a maximum power point tracker process.

15. The grid-interactive inverter of claim 14, wherein the controller is configured to disable the maximum power point tracker process and to control the voltage on the DC link capacitor to establish a predetermined voltage for the direct current input.

16. The grid-interactive inverter of claim 8, further comprising an autonomous grid inrush current limiter circuit comprising:
at least one resistor connected in series with the DC link capacitor;
a switch in parallel with the at least one resistor connected in series with the DC link capacitor; and
a capacitor charging circuit comprising a capacitor and at least one resistor connected in series with the capacitor, where the capacitor charging circuit is connected to the output terminals of the grid-interactive inverter and configured to charge the capacitor in the capacitor charging circuit using current drawn from the grid;
wherein the time constant of the capacitor and the at least one resistor in the charging circuit is longer than the time constant of the DC link capacitor and the at least one resistor in series with DC link capacitor; and
wherein the ON state of the switch connected in parallel with the at least one resistor connected in series with the DC link capacitor is controlled by the voltage level of the capacitor in the capacitor charging circuit such that the current flows through the switch when the voltage level of the capacitor exceeds a predetermined threshold.

17. The grid-interactive inverter of claim 16, wherein the switch in parallel with the at least one resistor connected in series with the DC link capacitor is a low ON state resistance MOSFET switch.

18. The grid interactive inverter of claim 1, further comprising:
a communication module that utilizes the grid cycle to perform symbol time alignment;
wherein the communication module is configured to transmit data using ON/OFF keying;

wherein the communication module is configured to encode transmitted data using an error correction code; and wherein the communication module is configured to adapt the number of symbol transmissions per grid cycle.

19. The grid interactive inverter of claim 18, wherein the error correction code is a Golay code.

20. The grid interactive inverter of claim 1, wherein:

the controller is capable of generating the control signals that cause the plurality of the switches in the DC-AC inverter to switch current bidirectionally across the output terminals to achieve a desired power factor; and the controller is capable of dynamically generating the control signals to offset local reactive load demands by changing the desired power factor in response to the measurement of the alternating output current that is provided to the grid.

21. The grid interactive inverter of claim 20, wherein the desired power factor ($PF_{desired}$) is determined by the ratio of the fundamental real ($I_{fund}$) and imaginary ($Q_{fund}$) amplitudes of the alternating output current such that:

$$PF_{desired} = \cos(\text{Angle}(I_{fund}/Q_{fund})).$$

* * * * *

UNITED STATES PATENT AND TRADEMARK OFFICE
CERTIFICATE OF CORRECTION

PATENT NO. : 10,651,724 B2
APPLICATION NO. : 16/172523
DATED : May 12, 2020
INVENTOR(S) : Christopher Richard Jones and Alexandre Rudolf Kral It is certified that error appears in the above-identified patent and that said Letters Patent is hereby corrected as shown below:

On the Title Page

Item (72), Lines 2-3, The spelling of Inventor name "Alexandre Rudolph Kral" should read -- Alexandre Rudolf Kral --.

Signed and Sealed this
Seventh Day of February, 2023

Katherine Kelly Vidal
*Director of the United States Patent and Trademark Office*